United States Patent
Thebault et al.

(10) Patent No.: US 7,950,581 B2
(45) Date of Patent: May 31, 2011

(54) SYSTEM AND METHOD OF ACQUIRING A MACHINE-READABLE SYMBOL

(75) Inventors: Patrice Thebault, Lapeyrouse Fossat (FR); Serge Thuries, Saint Jean (FR); Jean-Michel Puech, Toulouse (FR); Jean-Luc Basso, Montbrun-Lauragais (FR); H. Sprague Ackley, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 799 days.

(21) Appl. No.: 11/946,510

(22) Filed: Nov. 28, 2007

(65) Prior Publication Data

US 2008/0128501 A1 Jun. 5, 2008

Related U.S. Application Data

(60) Provisional application No. 60/872,159, filed on Dec. 1, 2006.

(51) Int. Cl.
*G06K 9/80* (2006.01)
(52) U.S. Cl. .................. 235/462.1; 235/462.11
(58) Field of Classification Search ............. 235/462.01, 235/460, 462.09, 462.1, 462.11
See application file for complete search history.

(56) References Cited

U.S. PATENT DOCUMENTS

| | | | |
|---|---|---|---|
| 4,354,101 A | 10/1982 | Hester et al. | |
| 5,243,665 A | 9/1993 | Maney et al. | |
| 5,471,533 A * | 11/1995 | Wang et al. | 380/51 |
| 5,777,309 A | 7/1998 | Maltsev et al. | |
| 5,877,486 A | 3/1999 | Maltsev et al. | |
| 5,920,059 A * | 7/1999 | Barile et al. | 235/462.07 |
| 6,446,868 B1 | 9/2002 | Robertson et al. | |
| 7,296,749 B2 | 11/2007 | Massieu | |

OTHER PUBLICATIONS

"Information Technology—Automatic Identification and data capture techniques—Bar code verifier conformance specification—Part 1: Linear symbols," International Standard, ISO/IEC 15426-1, Jun. 1, 2006, 6 pages.

"Information Technology—Automatic identification and data capture techniques—PDF417 bar code symbology specification," International Standard, ISO/IEC 15438, Jun. 1, 2006, 8 pages.

"Information technology—Automatic identification and data capture techniques—Reduced Space Symbology (RSS) bar code symbology specification," International Standard, ISO/IEC 24724, Nov. 1, 2006, 7 pages.

* cited by examiner

*Primary Examiner* — Daniel A Hess
(74) *Attorney, Agent, or Firm* — Seed IP Law Group PLLC

(57) ABSTRACT

A system and method for acquiring a machine-readable symbol are disclosed. Briefly described, one embodiment comprises receiving at least one scan line of a codeword row, determining a number of codewords of the codeword row, and collapsing an initialization symbol matrix into a partially-collapsed machine-readable symbol matrix based upon the determined number of codewords. Once the number of rows in the machine-readable symbol are determined, the partially collapsed machine-readable symbol matrix is further collapsed to the determined number of codeword rows.

42 Claims, 9 Drawing Sheets

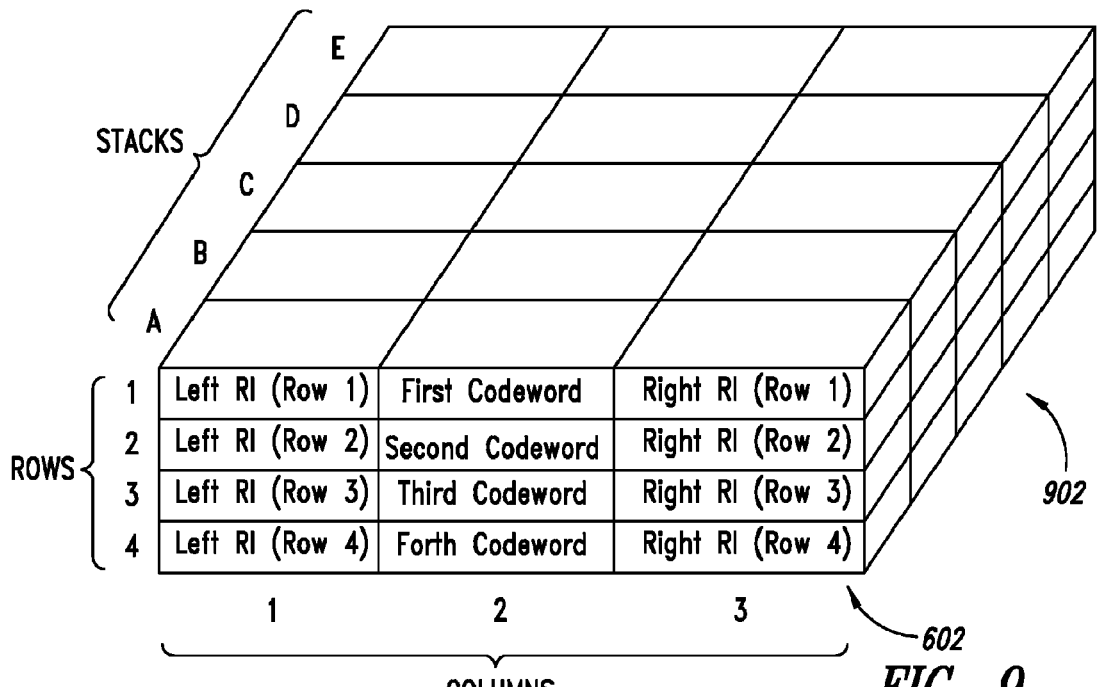

SYSTEM AND METHOD OF ACQUIRING A MACHINE-READABLE SYMBOL

CROSS-REFERENCE TO RELATED APPLICATIONS

This application claims the benefit under 35 U.S.C. §119(e) of U.S. provisional patent application Ser. No. 60/872,159, filed Dec. 1, 2006, the contents of which are herein incorporated by reference in their entirety.

BACKGROUND

1. Technical Field

This disclosure generally relates to machine-readable symbols, and more particularly to processing systems and methods for acquiring a machine-readable symbol.

2. Description of the Related Art

Machine-readable symbols provide a means for encoding information that is determinable when the machine-readable symbol is acquired by an optical-based detector. One exemplary type of machine-readable symbol is a bar code that employs a series of bars and white spaces vertically oriented along a single row. Groups of bars and spaces correspond to a codeword. The codeword is associated with an alpha-numeric symbol or other symbol. Once image data corresponding to the machine-readable symbol is acquired using an optical reading device, codeword(s) are decoded and information encoded into the symbol may be determined.

To facilitate encoding of greater amounts of information into a single machine-readable symbol, two-dimensional bar codes have been devised that employ two or more rows of vertically oriented bars and spaces, commonly referred to as stacked, matrix and/or area bar codes. Rows are typically adjacent to each other. Depending upon the machine-readable symbol format, row separators (such as a narrow line or space along the length of the symbol) may be used to facilitate identification of individual rows. Around the edges of a machine-readable symbol is an unmarked region, such as a white background or the like, referred to as a quiet area, which is used to demark the boundaries of the machine-readable symbol.

One type of optical reading device employs a matrix of light sensitive elements, such as in a charge coupled device (CCD), to acquire an image of a target machine-readable symbol. An image capture symbol reader captures a single image, which includes the symbol and the quiet areas around the machine-readable symbol. The captured image data is then stored into a suitable memory medium.

The direction of reading information from the matrix of light sensitive elements typically corresponds to the general orientation of the codeword rows of the machine-readable symbol because the rows of light sensitive elements generally are in alignment with the rows of the machine-readable symbol. Upon completion of receiving the image information from a row of light sensitive elements, referred to hereinafter for convenience as a scan line, light information from the next row of light sensitive elements, which corresponds to an adjacent portion of the machine-readable symbol, is received. This sequential line-by-line receiving of rows of light sensitive elements is continued until at least an area encompassing the entire target machine-readable symbol has been received. The width of a row of light sensitive elements (scan line) is relatively smaller than the vertical height of a codeword bar. Thus, several scans of a single codeword row of the matrix symbol occur as the symbol is scanned.

Detected light information received from the matrix of rows of light sensitive elements is processed into a digital data signal. The digital data is then stored into a suitable memory medium. The above-described line-by-line receiving process and storing the digitized data may be performed relatively quickly. The digitized data is then processed such that individual codewords are identified and subsequently decoded. However, analyzing the stored digitized data and decoding the data into codewords may require a significant amount of time if a large amount of information is encoded into the scanned machine-readable symbol.

Further, an image capture symbol reader requires a relatively sophisticated image processing system and a sufficiently large matrix of light sensitive elements to ensure that the captured image is sufficiently large to encompass all of the symbol and enough quiet area around the symbol to identify symbol boundaries. Further, the matrix of light sensitive elements must have sufficient resolution to discriminate between codeword rows of the machine-readable symbol. Accordingly, such optical devices are relatively expensive because of the complex processing system and large matrix of light sensitive elements. Also, optical image capture symbol readers may require a relatively long period of time for image processing and codeword decoding since a large amount of image information must be retrieved and processed.

Another type of optical device used to acquire information encoded in a symbol is an optical line scanner. The optical line scanner scans along a single line or path, and detects the bars and spaces of the target symbol one scan line at a time. One exemplary type of optical line scanner emits a focused beam of electromagnetic energy towards the target machine-readable symbol. The focused beam is moved along a path or line over the machine-readable symbol surface, referred to herein as a scan line.

Another exemplary type of optical line scanner emits electromagnetic energy towards the target symbol. An aperture means or the like receives returning electromagnetic energy from a relatively small portion of the machine-readable symbol, which is detected by the optical detector system of the optical line scanner. The position or orientation of the aperture means is adjusted such that a relatively small portion of detected electromagnetic energy is received along a path or line corresponding to the machine-readable symbol surface, also referred to herein as a scan line.

The direction of scanning along a scan line typically corresponds to the general orientation of the codeword rows of the machine-readable symbol. Upon completion of the scanning of a scan line, an adjacent portion of the machine-readable symbol is scanned. This sequential line-by-line scanning by successively moving scan lines across the machine-readable symbol scanning is continued until an area encompassing the entire target machine-readable symbol has been scanned.

The optical detector of the optical line scanner generates an analog signal that is processed into a digital data signal. The digital data is then stored into a suitable memory medium. The above-described line-by-line scanning process and storing the digitized data may be performed relatively quickly. However, analyzing the stored digitized signal data and decoding the data into codewords may require a significant amount of time if a large amount of information is encoded into the scanned machine-readable symbol.

In both of the above-described types of optical line scanners, the width of a scan line is relatively smaller than the vertical height of a bar. Thus, several scans of a single row of the matrix symbol occur as the symbol is scanned.

Initially, with either an image capture symbol reader or an optical line scanner, no information is known about the acquired machine-readable symbol. For example, the number of rows in the machine-readable symbol is not known. If the machine-readable symbol employs a format that allows for a variable row length, the number of codewords per row is not initially known. If the machine-readable symbol employs a format that allows for a variable number of codeword rows, the number of codeword rows is not initially known. If the machine-readable symbol format employs a variable level of error correction, the error correction parameters must be determined.

The stored data of the machine-readable symbol is analyzed on a row-by-row basis. If an optical line scanner is employed to read the machine-readable symbol, scan lines are decoded one line at a time. If an image capture symbol reader is employed to read the machine-readable symbol, information from rows of light sensitive elements are decoded one row at a time.

Typically, the decoded data is first analyzed to determine general information pertaining to the machine-readable symbol, such as the number of codewords per row, the number of rows, and/or the error correction information. As each row of data is decoded, the decoded data is typically stored into a memory using a suitable data matrix format. This process of populating the data matrix with codewords of an acquired machine-readable symbol is very time consuming when a large amount of information is encoded into a machine-readable symbol. That is, decoding a machine-readable symbol with a large number of codewords is a relatively slow process.

Accordingly, although there have been advances in the field, there remains a need in the art for decreasing decoding time of relatively large machine-readable symbols. The present disclosure addresses these needs and provides further related advantages.

BRIEF SUMMARY OF THE INVENTION

A system and method for acquiring a machine-readable symbol from a line scanning system are disclosed. Briefly described, in one aspect, an embodiment may be summarized as a method comprising receiving at least one scan line of a codeword row, determining a number of codewords of the codeword row, and collapsing an initialization symbol matrix into a partially-collapsed machine-readable symbol matrix based upon the determined number of codewords.

In another aspect, an embodiment may be summarized as a system that acquires a machine-readable symbol comprising an optical system operable to acquire information from the machine-readable symbol, a first memory portion operable to receive the acquired information, a second memory portion operable to initialize an initialization symbol matrix, and a processor. The processor is configured to receive at least one scan line of a codeword row, determine at least one codeword in the at least one scan line, populate the initialization symbol matrix with the at least one codeword, and determine a length of the codeword row.

In another aspect, an embodiment may be summarized as a method for validating codewords acquired from a machine-readable symbol comprising: receiving a first codeword from a first scan line; associating the first codeword with a first matrix stack; receiving a second codeword from a second scan line, wherein a location of the second codeword in the machine-readable symbol is the same as a location of the first codeword in the machine-readable symbol; comparing the second codeword to the first codeword; associating the second codeword with the first matrix stack in response to the second codeword matching the first codeword; and associating the second codeword with a second matrix stack in response to the second codeword not matching the first codeword.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 8 is a table illustrating a four word machine-readable symbol residing in a collapsed symbol matrix.

FIG. 9 is a conceptual diagram illustrating the collapsed symbol matrix for the machine-readable symbol of FIG. 4 and the corresponding codeword matrix stacks.

FIG. 10 is a conceptual diagram illustrating the codeword matrix stacks for the four codewords of interest of a machine-readable symbol.

DETAILED DESCRIPTION OF THE INVENTION

In the following description, certain specific details are set forth in order to provide a thorough understanding of various embodiments. However, one skilled in the art will understand that the invention may be practiced without these details. In other instances, well-known structures associated with imagers, line scanners, and/or other devices operable to read machine-readable symbols have not been shown or described in detail to avoid unnecessarily obscuring descriptions of the embodiments.

Unless the context requires otherwise, throughout the specification and claims which follow, the word "comprise"

and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Symbol Acquiring Device

Figure 1:
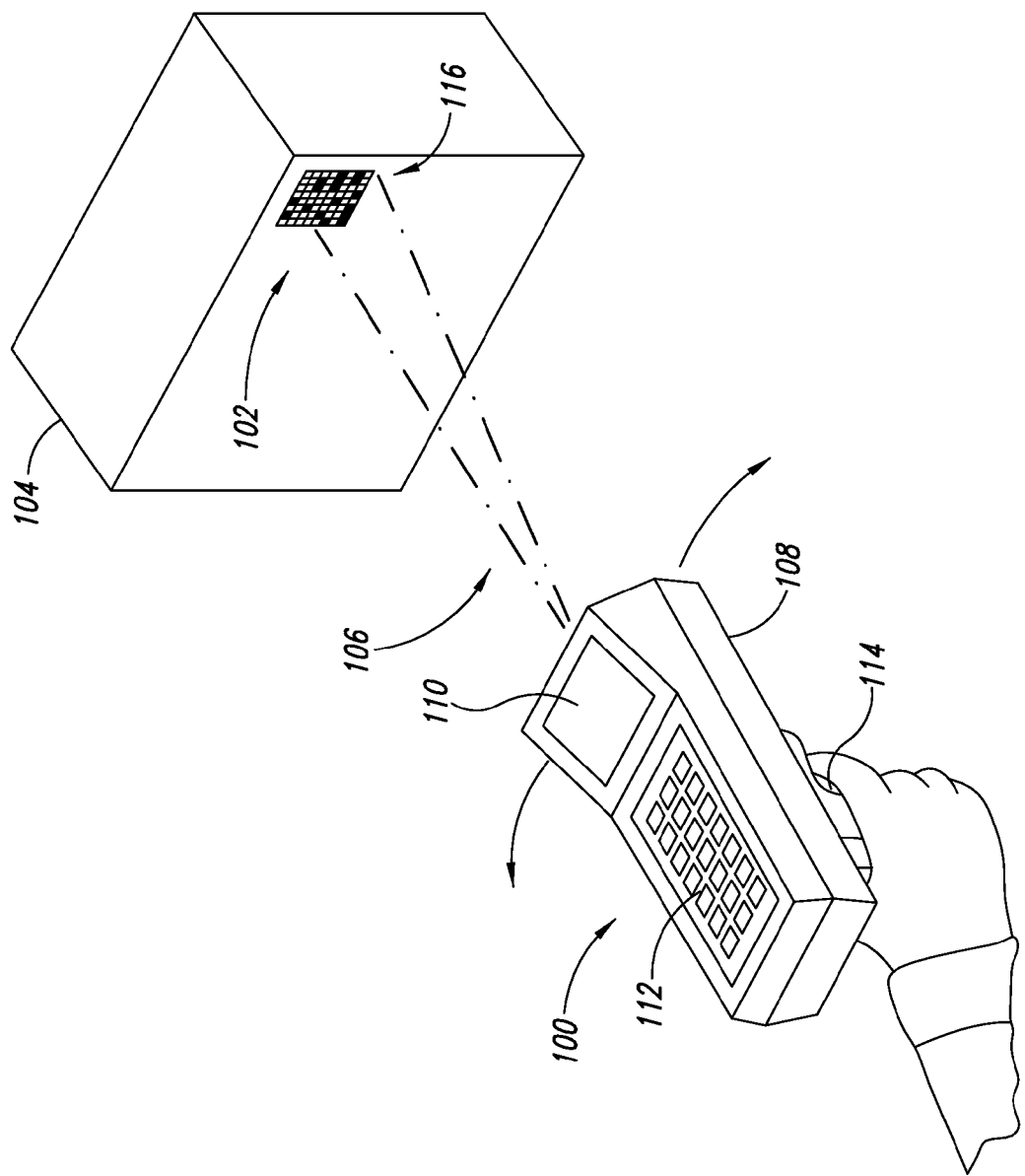
FIG. 1 is a perspective view of one illustrated embodiment of a machine-readable symbol reader acquiring optical data from a stack-type machine-readable symbol.

FIG. 1 is a perspective view of one illustrated embodiment of a machine-readable symbol reader 100 acquiring data from a stack-type machine-readable symbol 102. Any suitable optical system may be configured in accordance with any of the embodiments disclosed herein or any equivalent embodiments.

The stack-type machine-readable symbol 102 is affixed to a package 104 or the like such that the user points the high speed scanning device 100 towards the stack-type machine-readable symbol 102. Here, the machine-readable symbol reader 100 may be a line scanner operable to emit and sweep a narrow beam of electromagnetic energy across a field-of-view 106 over stack-type machine-readable symbol 102. In other embodiments, an aperture means, mirror, lens or the like is adjusted to sweep across a codeword line to receive returning electromagnetic energy from a relatively small portion (e.g., spot) of the machine-readable symbol, which is detected by an optical detector system of the optical line scanner. In yet other embodiments, a two-dimensional (2D) array symbol reader acquires a captured image of the machine-readable symbol (and a suitable region of quiet area around the machine-readable symbol).

The machine-readable symbol reader 100 is illustrated as having a housing 108, a display 110, a keypad 112, and an actuator device 114. Actuator device 114 may be a trigger, button, or other suitable actuator operable by the user to initiate the scanning process described herein.

For convenience, the machine-readable symbol 102 is illustrated and described as a stack-type machine-readable symbol (e.g., PDF417) that has a plurality of rows of codewords that are parallel and adjacent to each other. The machine-readable symbol 102 is surrounded by a quiet area 116. The quiet area 116 around the machine-readable symbol allows symbol boundaries to be identified.

The stack type machine-readable symbol 102 is intended to be generic and, thus, is illustrative of the various types and formats of machine-readable symbols. For example, some machine-readable symbols may consist of a single row of codewords (e.g., barcode). Other types of machine-readable symbols (e.g., matrix or area code) may be configured in non-rectangular shapes, such as circles of concentric rings or the like.

For convenience, the stack-type machine-readable symbol 102 is illustrated as employing a series of detectable bars and spaces for each codeword. A plurality of codewords are aligned in a codeword row. Since the number of codewords in a codeword row are the same, codewords align into columns. Other machine-readable formats may employ a variable number of codewords in a row or other types of detectable marks and/or characters. Further, the detectable marks need not be visible to the user. It is intended that all various types and formats of machine-readable symbologies be included within the scope of this disclosure.

Exemplary Reader Structure

Figure 2:
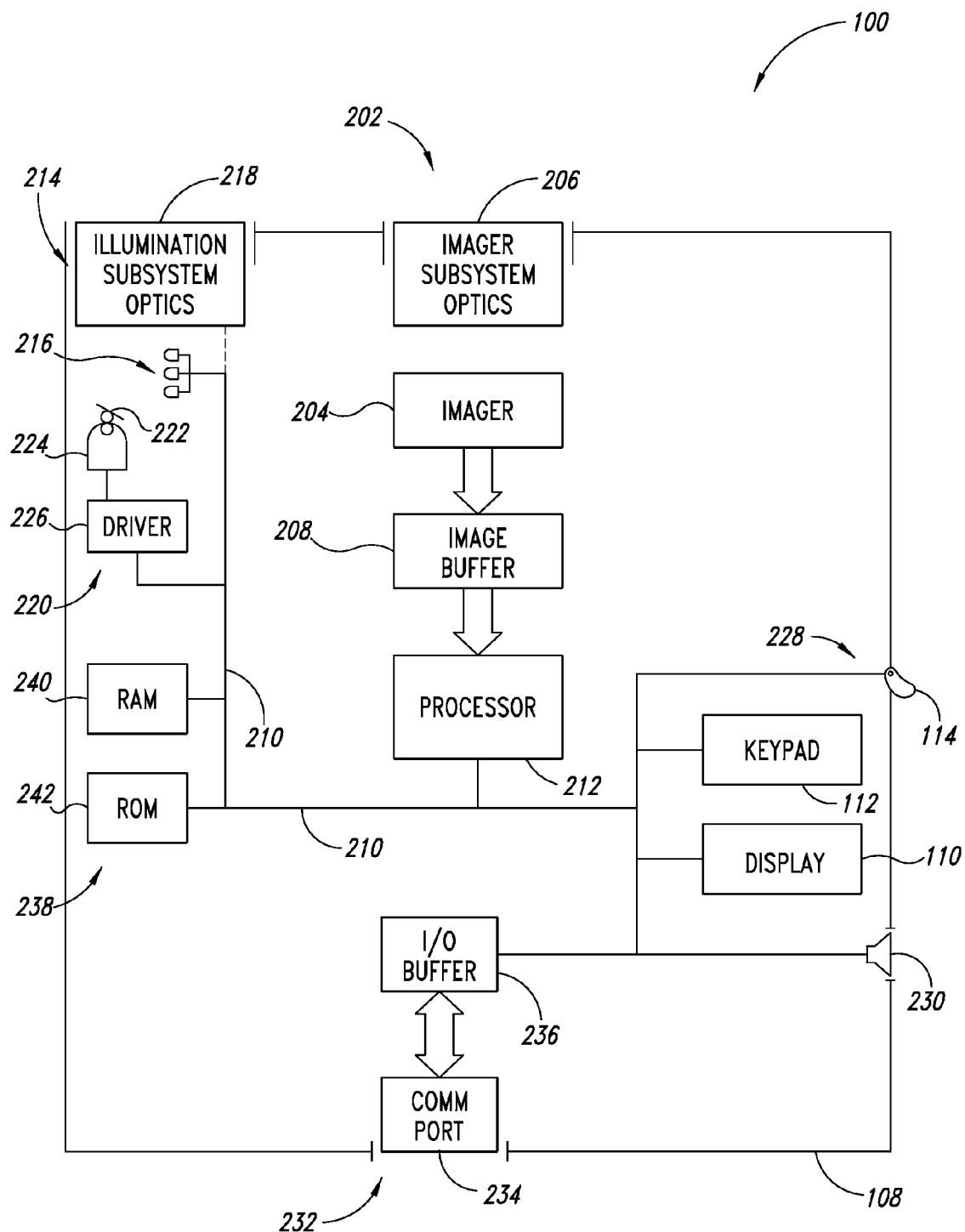
FIG. 2 is a functional block diagram of a machine-readable symbol reader according to one illustrated embodiment.

FIG. 2 is a functional block diagram of a machine-readable symbol reader 100 according to one illustrated embodiment. One or more of the illustrated elements may be received in the housing 108 of the machine-readable symbol reader 100. Alternatively, one or more of the illustrated elements may be external to the housing 108. Further, the machine-readable symbol reader 100 may omit some of the illustrated elements and/or may include other elements not illustrated in FIG. 2. Generally, the machine-readable symbol reader 100 may be an image capture symbol reader or a scanner.

Imaging Subsystem

The machine-readable symbol reader 100 may include an imaging subsystem 202, comprising an imager system 204, imager subsystem optics 206, and an image buffer 208.

The imager system 204 can take a variety of forms. As noted above, an image capture symbol reader embodiment employs an image capture device having a one- or two-dimensional array of light sensitive elements. Alternatively, an optical line scanner embodiment employs an aperture means, mirror, lens or the like that is adjusted to sweep across a codeword line to receive returning electromagnetic energy from a relatively small portion of the machine-readable symbol, which is detected by an optical detector system of the optical line scanner. Another type of optical line scanner embodiment projects and sweeps a narrow beam of electromagnetic energy across the machine-readable symbol 102. Any suitable optical detector means may be employed by various embodiments of the machine-readable symbol reader 100.

The imager subsystem optics 206 are generally spaced between the imager system 204 and a window of the housing 108 for optically rendering an image of the target or objects on the imager system 204. The imager subsystem optics 206 can take a variety of forms, including simple and/or compound lenses and/or reflectors, refractors, or filters. The imager subsystem optics 206 may be fixed and incapable of adjustment, or may be manually and/or automatically adjustable. For example, the imager subsystem optics 206 may include a motor, solenoid, and/or actuator for adjusting spacing between various optical elements to adjust a focus, aperture, and/or depth-of-field based on various input. Alternatively, or additionally, the imager subsystem optics 206 may include a microfluidic lens assembly such as that described in commonly assigned U.S. patent application Ser. No. 11/040,485, filed Jan. 20, 2005, and entitled "AUTOFOCUS BARCODE SCANNER AND THE LIKE EMPLOYING MICRO-FLUIDIC LENS." Signals for operating the imager subsystem optics 206 may be provided via a system bus 210.

The imager system 204 provides image data to an optional image buffer 208, which may temporarily store the image data for processing, for example via a processor 212. Thus, the processor 212, or portions thereof and/or functions performed thereby, may in some aspects be considered part of the imaging subsystem 202.

Illumination Subsystem

The machine-readable symbol reader 100 may include an optional illumination subsystem 214 operable to illuminate the field-of-view 106 (FIG. 1) of the machine-readable symbol reader 100. The illumination subsystem 214 may include an illumination source 216, illumination subsystem optics 218, and a positioning system 220.

The illumination source 216 may take the form of one or more light sources, for example, a number of light emitting diodes (LEDs). The illumination source 216 may be operable to selectively produce illumination on the machine-readable symbol. The illumination source 216 may provide illumination in a selected band of the electromagnetic spectrum, and/or may employ filters to provide illumination in a selected band. Alternatively, the illumination source 216 may provide illumination generally distributed across the visual range of the electromagnetic spectrum so that the machine-readable symbol reader 100 may be oriented with respect to a machine-readable symbol that is to be acquired.

The illumination subsystem optics 218 are generally spaced proximate a window of the housing 108 for illuminating the target machine-readable symbol. The illumination subsystem optics 218 can take a variety of forms, including simple and/or compound lenses and/or reflectors, refractors, or filters. The illumination subsystem optics 218 may be fixed and incapable of adjustment, or may be manually or automatically adjustable. For example, the illumination subsystem optics 218 may include a motor, solenoid, and/or actuator for adjusting the spacing between various optical elements to adjust a focus, aperture or depth-of-field based on various input. Alternatively, or additionally, the illumination subsystem optics 218 may include a microfluidic lens assembly such as that described in commonly assigned U.S. patent application Ser. No. 11/040,485, filed Jan. 20, 2005, and entitled "AUTOFOCUS BARCODE SCANNER AND THE LIKE EMPLOYING MICRO-FLUDIC LENS." Signals for operating the illumination subsystem optics 218 may be provided via the system bus 210.

The positioning subsystem 220 may include one or more reflectors 222, an actuator 224 coupled to move the reflectors 222, and an optional driver 226 for driving the actuator 224. The reflector 222 may take the form of a mirror or prism, or an array of micro-machined mirrors. The driver 226 is coupled to the processor 212 via the system bus 210. Thus, the processor 212, portions thereof, and/or functions performed thereby, may in some aspects be considered a portion of the illumination subsystem 214.

User I/O Subsystem

The machine-readable symbol reader 100 may further comprise an optional user input/output (I/O) subsystem 228. The user I/O subsystem 228 may include a user operable keypad 112, a display 110, an optional speaker 230, and one or more user operable switches, such as switch 114.

The keypad 112 may take the form of any conventional keypad, allowing the user to manually enter instructions and/or data by keying. The display screen 110 may take the form of any conventional display, for example, a liquid crystal (LCD) display capable of visually displaying information to the user. The display 110 may optionally take the form of a touch screen display, allowing the user to enter commands and data by selecting icons displayed on the display 110. The speaker 230 may be conventional and operable to provide audible information to the user. Such audible information may, for example, take the form of alerts such as beeps and/or buzzes, as well as synthesized voice.

The switch 114 may be conveniently located on the housing 108 to allow the user to selectively activate the machine-readable symbol reader 100, for example, to acquire the target machine-readable symbol 102. In one embodiment, the switch 114 takes the form of a trigger positioned on the housing 108 to be selectively operated using the index finger of the user while grasping the machine-readable symbol reader 100. The positioning of the switch 114 for activation by the index finger may provide ergonomic advantages, for example, apportioning the repetitive activity between the digits of the user's hand, and may be easier for a novice user to learn.

Alternative embodiments may omit the user I/O subsystem 228 such that machine-readable symbols are automatically detected when in proximity to the above-described imaging subsystem 202. For example, an embodiment of a machine-readable symbol reader 100 may be located at a product purchase check-out counter and be operable to automatically acquire the machine-readable symbol which may be on or affixed to a purchased product.

Communications Subsystem

The machine-readable symbol reader 100 may further comprise a communications subsystem 232 for communicating with other devices. The communications subsystem 232 may include an interface such as a communications port 234 and an optional I/O buffer 236 coupling the communications port 234 to the system bus 210. The communications subsystem 232 may be of conventional design.

Control Subsystem

The machine-readable symbol reader 100 further includes a control subsystem 238 which may comprise the system bus 210, processor 212, and a memory such as random access memory (RAM) 240 and/or read-only memory (ROM) 242. While the processor 212 is illustrated using a single box, the processor 212 may take the form of one or more processors, such as microprocessors, digital signal processors (DSPs), and/or application specific integrated circuits (ASICs). For example, the machine-readable symbol reader 100 may comprise a processor for controlling operation of the various subsystems 202, 214, and a dedicated DSP for handling the image processing and/or decoding. The control subsystem 238 may contain additional or other memory devices, including flash memory and/or EEPROMs, hard disks, optical disks such as CD-ROMs, etc.

PDF417 Codeword Format

One exemplary multi-row bar code format is the PDF417 format developed by Symbol Technologies, Inc. and standardized by AIM and ISO. The PDF417 format employs a plurality of adjacent rows of vertically oriented, alternating bars and spaces, wherein groups of bars and spaces define a single codeword (four bars and four spaces per codeword). A symbol using the PDF417 format may have between three and ninety codeword rows. Each codeword row may have between one and thirty data codewords. Also, the vertical height of a codeword row is relatively short, and codeword row separators are not used. Accordingly, the PDF417 format may provide a relatively high density of information encoding in a single symbol.

Each row of a PDF417 format symbol comprises a start codeword (start pattern) to indicate the beginning of the row, a left row indicator to indicate the left-hand side of the row, one to thirty data codewords, a right row indicator to indicate the right-hand side of the row, and an end codeword (end pattern) to indicate the ending of the row. As noted herein, start and end codewords include some amount of symbol format information. Since a symbol may have between one and thirty data codewords per row, the length of the rows in any particular symbol is variable between symbols (although the specified length of all rows of the symbol must be the same). A "quiet area" (white region) surrounds the entire symbol so that the device acquiring the symbol can determine the symbol boundaries.

As noted above, the PDF417 format uses relatively short vertical bar heights and no row separators. Two techniques differentiate between codeword rows of a PDF417 format symbol. First, a row number is specified in every left row indicator (RI) and right row indicator. When a scan line begins and ends on the same row, the left row indicator and the right row indicator will have the same row number. Accordingly, all of the decoded codewords between the left row indicator and the right row indicator may be associated with the row identified in the row indicators.

However, if the acquired scan lines are not aligned with the codeword rows, some scan lines will traverse two or more codeword rows. In such situations, the left row indicator and the right row indicator will have different row numbers (if decoded and compared with each other).

When a scan line traverses two or more codeword rows, a second technique is available to identify codeword rows so that the decoding system may determine which codeword row each codeword belongs to. One of three different codeword sets or types, referred to as "clusters" (identified by a cluster number of 0, 3, or 6), is used to encode each of the codewords of an individual codeword row. Thus, all of the codewords in adjacent codeword rows will be identifiable by the cluster number used to encode that codeword row.

Codeword rows alternate in the codeword set or cluster number that is used to specify codewords. For example, in a five-row symbol, the first and fourth codeword rows will be encoded using the "0" cluster. The second and fifth codeword rows will have a "3" cluster number. The third codeword row will have a "6" cluster number.

For example, consider a scan line that traverses portions of the second and third codeword rows. The second codeword row will be associated with the 3 cluster number and the third codeword row will be associated with the 6 cluster number. Each codeword may be individually analyzed to determine its cluster number. Codewords encoded using the 3 cluster number will be in the second codeword row. Codewords encoded with the 6 cluster number will be in the third codeword row.

The codeword at the point where the scan line crosses codeword rows may not be determinable since the detected optical data corresponds to two portions of different, vertically adjacent codewords. Error correcting routines may be used to determine the codeword. For example, a codeword row may be acquired with a plurality of scan lines. If a codeword is indeterminable, the codeword may be determined from the error correction information. However, a more simplified and efficient process for identifying and verifying codewords used by selected embodiments is described in greater detail hereinbelow.

Initialization Symbol Matrix

Figure 3:
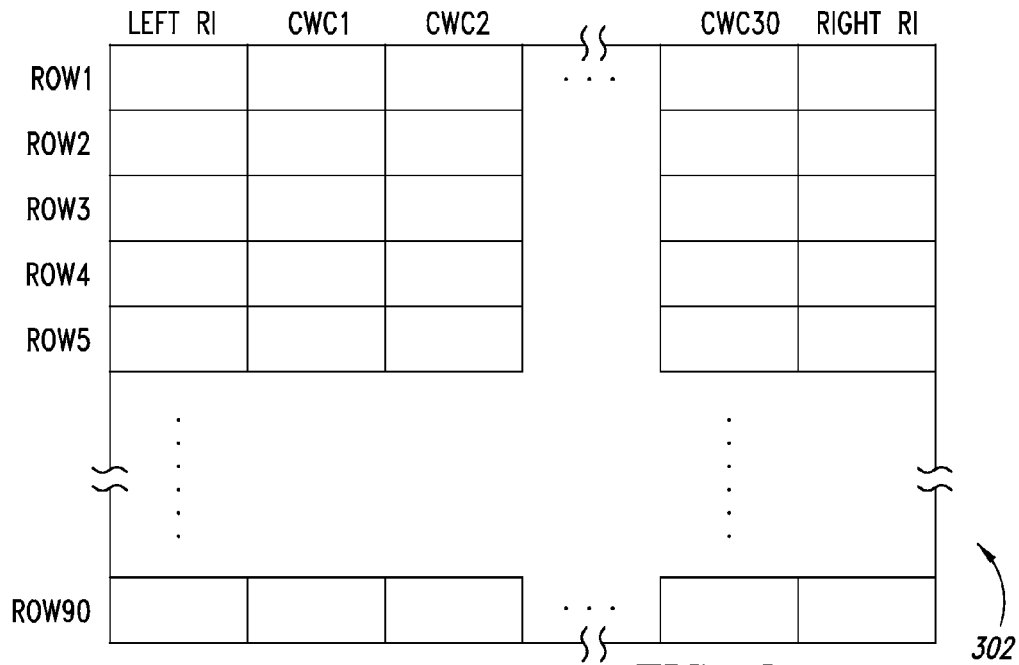
FIG. 3 is a conceptual diagram illustrating the maximum size of a machine-readable symbol matrix.

FIG. 3 is a conceptual diagram illustrating the maximum size of an exemplary initialization symbol matrix 302. The initialization symbol matrix 302 is intended to represent a matrix for storage of data or information corresponding to a plurality of codewords acquired from a machine-readable symbol 102. The matrix of data or information may be stored in any suitable format in a memory, such as, but not limited to, RAM 242 (FIG. 2). Further, the initialization symbol matrix 302 may only require a small portion of memory, wherein other portions of the memory are used for other purposes, such as receiving information corresponding to the acquired machine-readable symbol 102. For convenience and brevity, computational generation of the initialization symbol matrix 302, storage of the initialization symbol matrix 302 into a suitable memory medium, and/or population of the initialization symbol matrix 302 with acquired codewords from a machine-readable symbol 102 is not described in detail since such operations and processes are well understood in the arts.

The exemplary initialization symbol matrix 302 is described in the context of the above-described PDF417 format. Under the PDF417 format, the maximum size of the machine-readable symbol is 928 codewords, which may be placed in no more than thirty columns (thirty codewords per codeword row) or no more than ninety codeword rows.

As noted above, the first codeword of a codeword line in a PDF417 machine-readable symbol is the start character. The second codeword of a codeword row in a PDF417 machine-readable symbol is the left row indicator (RI). In the exemplary embodiment described below, the left code word indicator is stored into codeword left row indicator (LRI) column. Codewords having encoded information of interest then follow in CWC 1, up through CWC 30. If thirty codewords having encoded information of interest are used in the PDF417 machine-readable symbol codeword row, then the last codeword (in CWC 30) is the codeword immediately before the right row indicator (RI).

In the various embodiments, the process of decoding an acquired machine-readable symbol 102 (FIG. 1) begins by defining a initialization symbol matrix 302. When a PDF417 format is employed, the initialization symbol matrix 302 may be a 30 by 90 matrix. It is appreciated that no single PDF417 symbol can have both 90 rows and 30 columns because of the 928 codeword limit. As will be described in greater detail below, defining the initialization symbol matrix 302 allows acquired codewords to be stored into the initialization symbol matrix 302 before the size of the acquired machine-readable symbol 102 is determined.

In a conventional symbol reader, determining the size of a matrix to store acquired codewords requires that the size of the acquired machine-readable symbol 102 be first determined. For example, a conventional machine-readable symbol reader must make a determination of the number of codewords in a row and make a determination of the number of codeword rows in order to define the size of a matrix required to store acquired codewords.

However, since embodiments of the machine-readable symbol reader 100 initialize with the initialization symbol matrix 302, the size of the matrix required to store acquired codewords need not be initially determined. That is, the initialization symbol matrix 302 is always at least large enough to allow population of the matrix 302 with acquired codewords (or corresponding decoded information).

As the acquired codewords (or corresponding decoded information) are received from the scanning process, each codeword (or corresponding decoded information) is stored into the initialization symbol matrix 302 at its appropriate codeword row and column location. That is, the acquired codewords (or corresponding decoded information) are used to populate the initialization symbol matrix 302.

Collapsing the Symbol Matrix to the Length of a Codeword Row

Once the initialization symbol matrix 302 is partially populated with at least one entire codeword row, the number of codewords in a row is known. The number of codewords is known because a scanned line that includes both the left row indicator and a corresponding right row indicator will necessarily have included therein all codewords of a row. Thus, the number of codewords is determined by summation. Then, the initialization symbol matrix 302 may be collapsed into a smaller, partially-collapsed symbol matrix 502 (FIG. 5) with fewer code words per row.

For example, assume that a machine-readable symbol that is to be scanned has twenty codewords per row. Prior to the first scan, the machine-readable symbol reader 100 does not know this information, however the machine-readable symbol reader 100 initializes with the initialization symbol matrix 302, here 30 codewords per row and 90 codeword rows. Once the first complete scan of a codeword row occurs, the machine-readable symbol reader 100 determines that the scanned machine-readable symbol has twenty codewords. In one embodiment, the initialization symbol matrix 302 is collapsed into a partially-collapsed matrix 502 having twenty codeword columns.

Furthermore, the machine-readable symbol reader 100 can determine that there are at most forty-six (46) codeword rows in the scanned machine-readable symbol (928 codewords maximum per machine-readable symbol, divided by the known twenty codewords per row, equals forty-six codeword rows). Accordingly, the initialization symbol matrix 302 may be further collapsed into a partially-collapsed matrix 502 having twenty codeword columns and forty-six codeword rows.

Furthermore, some embodiments of the machine-readable symbol reader 100 save the above-described codewords from the first successfully scanned line. The process of collapsing the initialization symbol matrix 302 is described in greater detail below.

The process of receiving acquired codewords (or corresponding decoded information) may be performed by the various embodiments of the machine-readable symbol reader 100 relatively faster than conventional readers because the various embodiments do not need to initially analyze and/or decode enough codewords to determine the size of the required matrix. As noted above, conventional readers must first decode at least sufficient information from an acquired machine-readable symbol (the number of codewords in a row and the number of codeword rows) to initialize in memory a conventional symbol matrix corresponding to the size of the acquired machine-readable symbol. Also, the conventional readers discard any scanned codewords while the matrix size is being determined. Then, after the conventional symbol matrix has been initialized in memory, the conventional reader may then populate the conventional symbol matrix with acquired codewords on subsequent scans (or corresponding decoded information).

For convenience, embodiments of the machine-readable symbol reader 100 and the various associated processes of decoding acquired machine-readable symbol information are described in the context of the PDF417 data format. Other embodiments may acquire and decode other types and/or formats of machine-readable symbols. Based upon the type of machine-readable symbol and/or format, a corresponding initialization symbol matrix 302 may be initialized in the working memory.

The dimensions of the initialization symbol matrix 302 may be pre-stored in memory such that, upon initialization, the initialization symbol matrix 302 is established in a working memory, such as the RAM 240 (FIG. 2) or another suitable memory medium. In other embodiments, the initialization symbol matrix 302 may be permanently pre-allocated into the working memory.

Figure 4:
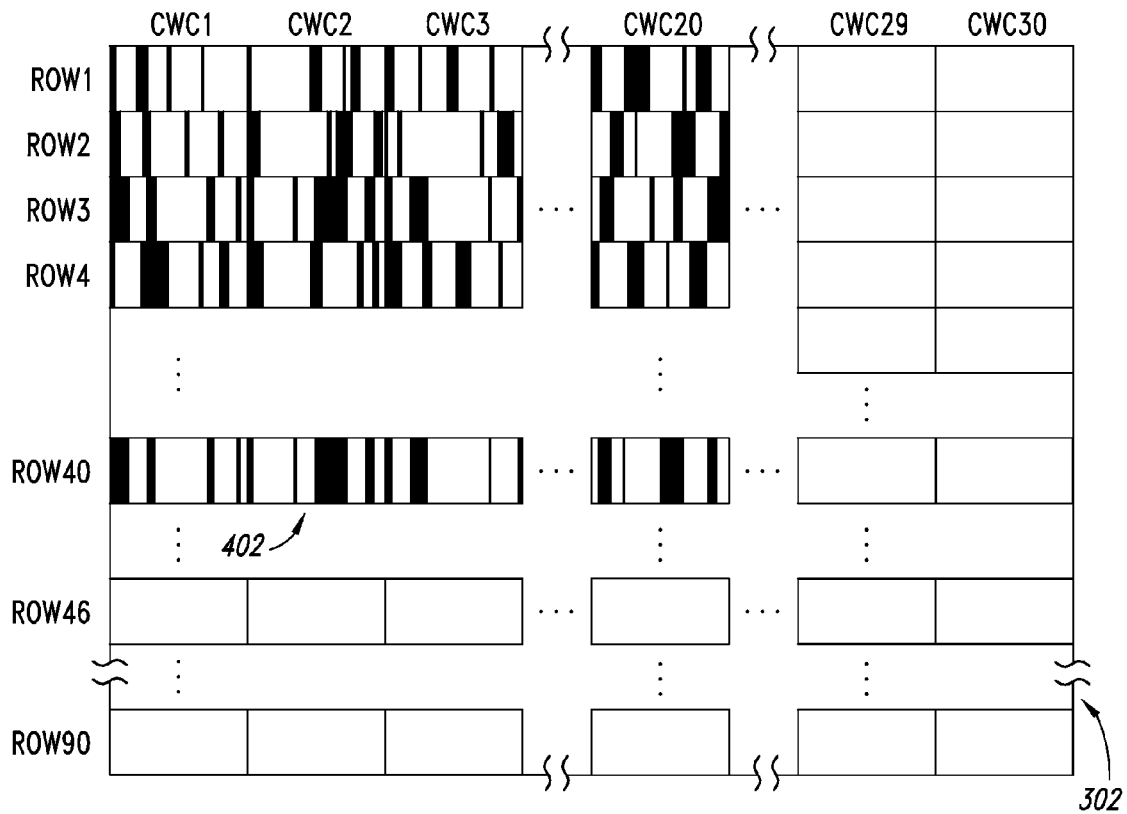
FIG. 4 is a diagram illustrating a machine-readable symbol with four codewords of information of interest superimposed over the initialization symbol matrix of FIG. 3.

FIG. 4 is a diagram illustrating a machine-readable symbol 402 with a plurality of codeword rows of information of interest superimposed over the initialization symbol matrix of FIG. 3. That is, for purposes of describing the various embodiments, the exemplary machine-readable symbol 402 is illustrated as having twenty codewords per codeword row. Also, the exemplary machine-readable symbol 402 is illustrated with forty codeword rows (row 1 through row 40). (As noted above, if the machine-readable symbol 402 has twenty codewords per codeword row, the maximum number of codeword rows that the machine-readable symbol 402 may have is forty-six codeword rows by virtue of the 928 codeword limitation for a machine-readable symbol under the exemplary PDF417 format.)

The machine-readable symbol 402 is formatted under the exemplary PDF417 format that uses four bars and four spaces to encode one codeword (or its corresponding encoded information). It is appreciated that the illustration of a codeword as a series of bars and spaces is intended for illustration purposes and for conceptually describing operational processes used by various embodiments of the machine-readable symbol reader 100. When the initialization symbol matrix 302 is populated with acquired codewords (or corresponding decoded information), the information stored into a matrix location is digital data that is suitably formatted for storage in the initialization symbol matrix 302 and/or the memory medium where the initialization symbol matrix 302 resides.

Because an initialization symbol matrix 302 has been initialized in a suitable working memory, the scan lines corresponding to a row of codewords may be used to directly populate the initialization matrix 302. Various embodiments of the machine-readable symbol reader 100 populate the initialization matrix 302 without first determining the matrix size of the target machine-readable symbol that is currently being acquired.

As noted above, the beginning of the codewords on each scan line is determinable since the first codeword follows the start character used by the exemplary PDF417 format which is preceded by a quiet area (typically a white-colored region). The first codeword includes the value of the row number. And, the end of a scan line is determinable since the last codeword is followed by the quiet end character and/or area (which may be preceded by the right row indicator character used by the exemplary PDF417 format). In the example described above, various embodiments of the machine-readable symbol reader 100 identify the quiet areas, start characters, and end characters as they are received from memory. The quiet areas, start characters, left row indicator characters, right row indicator characters, and/or end characters (if present) are not used in the population of the initialization symbol matrix 302 in this exemplary embodiment. In other embodiments, the initialization symbol matrix 302 may be sufficiently large to include quiet areas, start characters, left row indicator characters, right row indicator characters, and/or end characters.

To begin an illustrative example of acquiring the machine-readable symbol 402, assume that the first scan line only captures a portion of a first codeword row, such as the left row indicator and five codewords of the second codeword row. No information regarding the number of codewords in a codeword row is determinable from this scan line. (However, in various embodiments, the five codewords are stored in the initialization symbol matrix 302 in view that the left row indicator includes the row number of the scan line.)

Continuing with the illustrative example, a second scan line might include four codewords and the right row indicator of the fourth codeword row. The second scan line may be of the same codeword row or of a different codeword row. Again, no information regarding the number of codewords in a codeword row is determinable from this exemplary second scan line (thought the four codewords may be stored in the initialization symbol matrix in view that the right row indicator includes the row number of the second scan line).

However, assume that a third scan line in the illustrative example includes both the left row indicator, the right row indicator, and all intervening codewords of a single codeword row. Since both the left row indicator and the right row indicator are identified, then the number of intervening codewords of the codeword row may be determined, here twenty codewords. Accordingly, the machine-readable symbol reader 100 knows that all codeword rows of the machine-readable symbol 402 have twenty codewords. Further, assuming that the information in the row indicators includes the row number, the twenty codewords are saved into the initialization symbol matrix 302 at the appropriate row.

Figure 5:
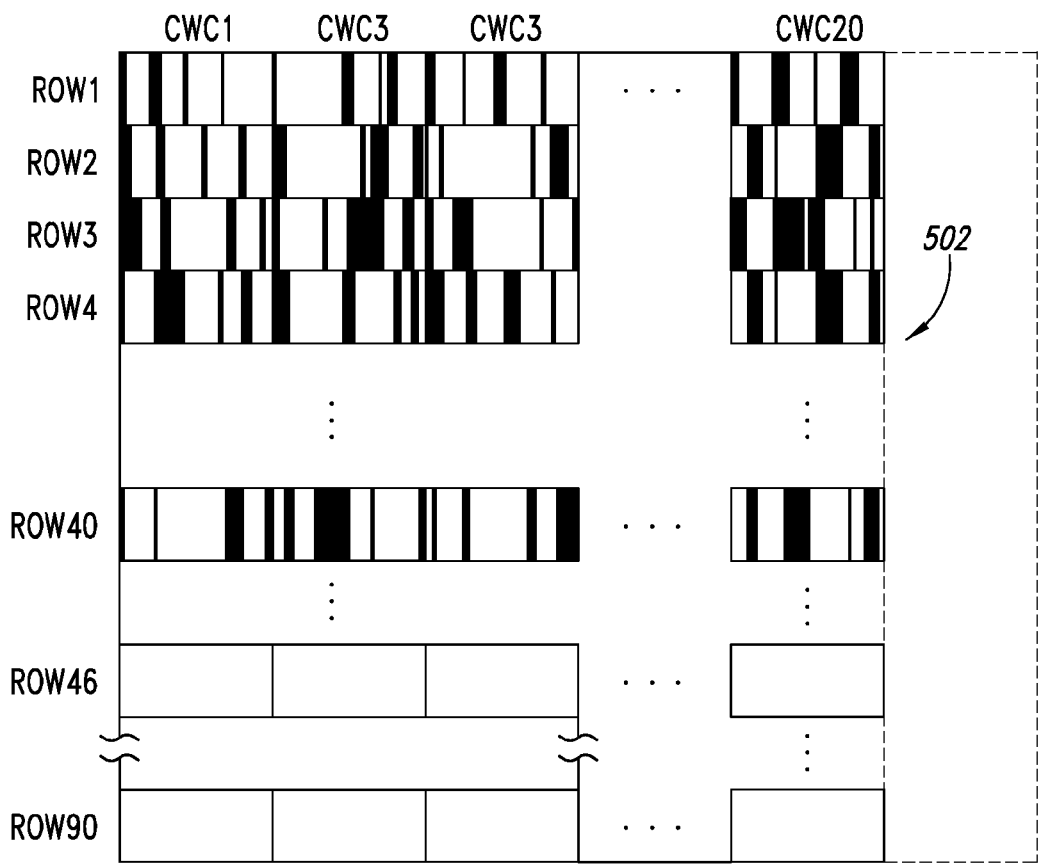
FIG. 5 is a diagram illustrating the machine-readable symbol of FIG. 4 following collapse of the initialization symbol matrix after determination of the row length of the machine-readable symbol of FIG. 4.

FIG. 5 is a diagram illustrating the machine-readable symbol 402 (FIG. 4) following collapse of the initialization symbol matrix 302 after a complete codeword row is acquired, thereby allowing determination of the row length of the machine-readable symbol 402. As noted above, the initialization symbol matrix 302 is used to receive and/or store the acquired codewords (or the corresponding decoded information). Summarizing this point in the decoding process of the exemplary machine-readable symbol 402, the machine-readable symbol reader 100 has determined the length of a codeword row to be twenty codewords.

Once the length of a codeword row has been determined to be twenty codewords (in this example), the initialization symbol matrix 302 may be collapsed to correspond to the determined codeword row length. That is, a partially-collapsed machine-readable symbol matrix 502 is generated from the initialization symbol matrix 302. In this simplified example of the machine-readable symbol 402 having forty codeword rows with twenty codewords in each codeword row, the initialization symbol matrix 302 is collapsed from thirty columns to twenty columns to generate the partially-collapsed machine-readable symbol matrix 502.

As noted above, a single machine-readable PDF417 format symbol has at most 928 codewords. In view that the machine readable symbol 402 has twenty codewords per row, then the machine-readable symbol reader 100 may determine that at most the machine readable symbol 402 may use forty-six codeword rows. Accordingly, the partially-collapsed machine-readable symbol matrix 502 may be further collapsed to forty-six rows (from the original ninety rows of the initialized symbol matrix 302). At this point in the process, the partially-collapsed machine-readable symbol matrix 502 corresponds to the maximum size of a PDF417 format symbol that has twenty codewords per row (a twenty codeword by forty-six row symbol matrix).

In various embodiments, the length of a codeword row may be dynamically determined after the initialization symbol matrix 302 has been populated with at least one complete codeword left row indicator and/or right row indicator. Dynamically determining codeword row length from at least one left row indicator and/or right row indicator allows collapse of the initialization symbol matrix 302 into the partially-collapsed machine-readable symbol matrix 502 after the codeword row length is determined.

Figure 6:
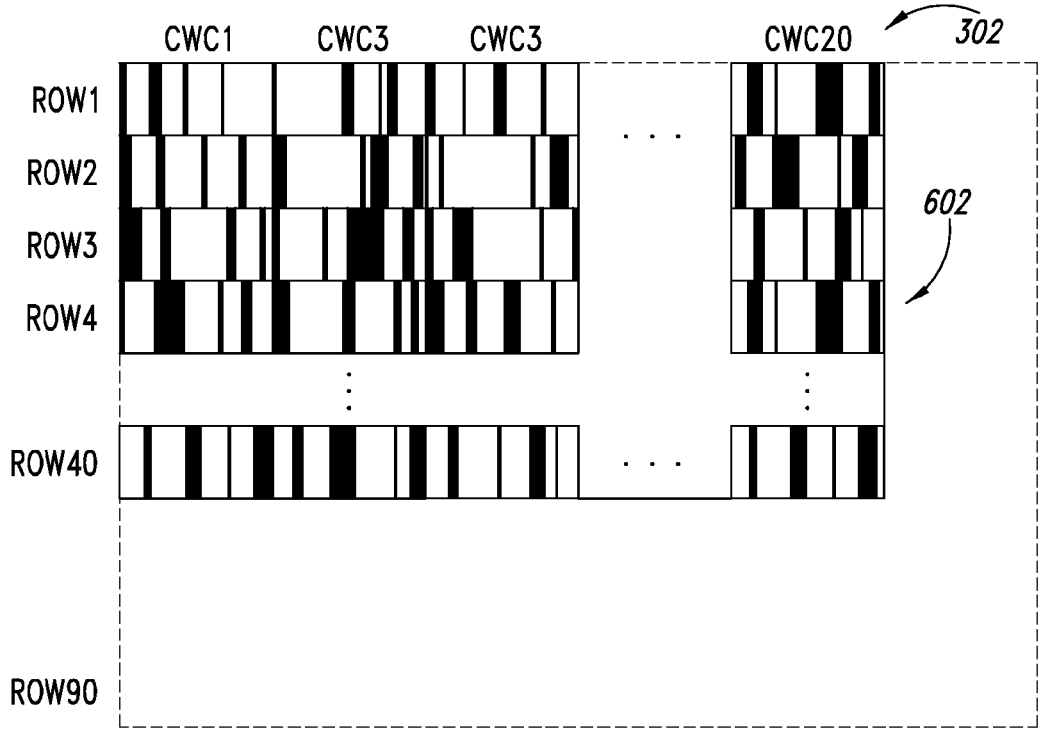
FIG. 6 is a diagram illustrating the machine-readable symbol of FIG. 4 following collapse of the symbol matrix following determination of the row number of the machine-readable symbol of FIG. 4.

FIG. 6 is a diagram illustrating the machine-readable symbol 402 (FIG. 4) following further collapse of the partially-collapsed machine-readable symbol matrix 502 (FIG. 5). The partially-collapsed machine-readable symbol matrix 502 is collapsed into the collapsed machine-readable symbol matrix 602 following determination of the number of codeword rows of the machine-readable symbol 402.

Collapsing the Symbol Matrix to the Number of Codeword Rows

As noted above, in selected embodiments, the initialization symbol matrix 302 is used to receive acquired codewords (or corresponding decoded information). At some point in the decoding process, the machine-readable symbol reader 100 determines the number of codeword rows. Once the number of codeword rows has been determined, the partially-collapsed machine-readable symbol matrix 502 may be further collapsed to correspond to the determined number of codeword rows.

Depending upon the symbol format, the number of codeword rows may be determinable from the left row indicator and/or right row indication information. Thus, the row indication information can be analyzed to determine that in the example above, there are forty rows of codewords in the exemplary machine-readable symbol matrix 402. In this simplified example of the machine-readable symbol 402 having forty codeword rows with twenty codewords in each codeword row, the partially-collapsed machine-readable symbol matrix 402 is further collapsed from forty-six rows to forty rows to generate the collapsed machine-readable symbol matrix 602. If a different number of codeword rows are determined from the left row indicator and/or right row indicator information, the partially-collapsed machine-readable symbol matrix 402 may be collapsed from forty-six codeword rows to the determined number of codeword rows. In alternative embodiments, determining the number of codeword rows may be made after the initialization symbol matrix 302 has been populated with all of the acquired codewords (or corresponding decoded information). As noted above, the acquired codewords (or corresponding decoded information) may be quickly received to populate the initialization symbol matrix 302 or a partially-collapsed machine-readable symbol matrix 502.

In other embodiments, the determination of the number of codeword rows may occur after the initialization symbol matrix 302 has been populated with the last codeword row. The occurrence of the last codeword row is determinable when the received information from memory transitions into the quiet area. For example, a "codeword" with no bars would correspond to the quite area. That is, presence or absence of an acquired valid codeword (or corresponding decoded information) in the initialization symbol matrix 302 or the partially-collapsed machine-readable symbol matrix 502 may demark the last codeword row such that the collapsed machine-readable symbol matrix 602 may then be generated.

Figure 7:
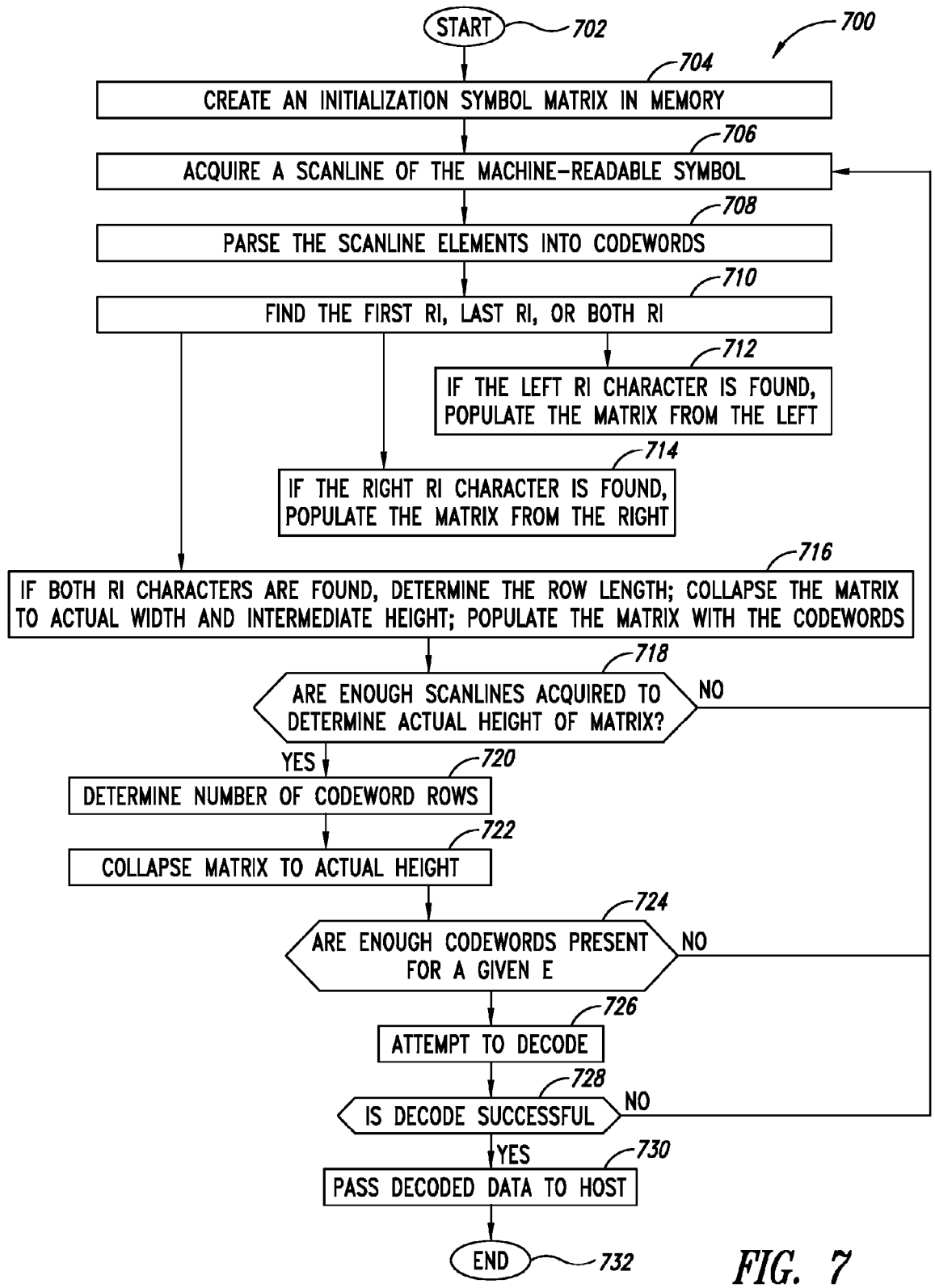
FIG. 7 is a flowchart illustrating an embodiment of a process for populating and collapsing an initialization symbol matrix as scanned information for a machine-readable symbol is processed.

FIG. 7 is a flowchart 700 illustrating an embodiment of a process for populating and collapsing an initialization symbol matrix 302 (FIG. 3) as acquired information for a machine-readable symbol 102 (FIG. 1) is processed. An embodiment may implement the logic of flowchart 700 with hardware configured as a state machine. In this regard, each block may represent a module, segment, or portion of code, which comprises one or more executable instructions for implementing the specified logical function(s). It should also be noted that in alternative embodiments, the functions noted in the blocks may occur out of the order noted in FIG. 7, or may include additional functions. For example, two blocks shown in succession in FIG. 7 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure. For convenience, FIG. 7 generally illustrates a first phase of the process wherein an initialization matrix 302 is partially collapsed upon determination of the number of codewords in a codeword row. FIG. 7 further generally illustrates a second phase wherein the partially collapsed symbol matrix is further collapsed upon determination of the number of codeword rows in the machine-readable symbol.

The process begins at block 702. An initialization symbol matrix 302 is created in memory at block 704. A scan line of the machine-readable symbol 102 is acquired at block 706. The elements of the acquired scan line are parsed into codewords at block 708.

The first or last row indicator (RI) character, or both, are found at block 710. If the first RI character is found at block 712, the matrix is populated from the left. If the last RI character is found, the matrix is populated from the right at block 714. After blocks 712 and 714, the process loops back to block 706 to acquire another scan line. If both the first and the last RI characters are found, the row length (number of codewords in a codeword row) is determined such that the matrix width is collapsed to its actual width and the matrix is populated with the codewords at block 716. As noted above, the height is collapsed to the maximum possible matrix height (maximum number of codeword rows) in view of the determined number of codewords per codeword row.

Once the number of codewords per codeword row is determined at block 716, the matrix height may be collapsed at block 716 to an intermediate height corresponding to at least the maximum number of codeword rows in view of the determined number of codewords per row. (Referring to the example described above and illustrated in FIGS. 3-6, once the determination was made that the machine-readable symbol had twenty codewords in a codeword row, it was further determined that the maximum number of codeword rows possible was forty-six in view of the maximum number of 928 codewords.)

After the number of codewords per row is determined at block 716, additional scan lines are acquired. At block 718, a determination is made whether the height (the number of codeword rows) of the matrix can be determined based upon the acquired scan lines. If not (the NO condition), the process returns to block 706 to acquire more scan lines. If the matrix height is determinable (the YES condition), the number of codeword rows is determined at block 720. In alternative embodiments, the row indicator characters may be used to determine the number of codeword rows.

The matrix is further collapsed at block 722 to correspond to the number of determined codeword rows (the actual matrix height). At block 724, a determination is made whether the row indicator characters may be used to determine the error correction (E). If not (the NO condition), the process returns to block 706 to acquire additional scan lines. If enough codewords are present for a given error correction (the YES condition), the process proceeds to block 726 where an attempt is made to decode the symbol.

At block 728, a determination is made whether the decode was successful. If not (the NO condition), the process returns to block 706 to acquire additional scan lines. If the decode of the symbol was successful (the YES condition), the process proceeds to block 730 where the decoded data is passed to a host for further processing. The process ends at block 732.

Codeword Verification

As noted above, a plurality of scan lines are acquired for each codeword row of the machine-readable symbol. Further, if the acquired scan lines are not aligned with the codeword rows, some scan lines will traverse two or more codeword rows. In such situations, the left row indicator and the right row indicator will have different row numbers. Further, it is probable that at least one of the codewords will be in error since that codeword will be comprised of symbols from two different vertically adjacent codewords.

Returning to an exemplary machine-readable symbol employing the PDF417 format, when a scan line traverses two or more codeword rows, "clusters" (identified by a cluster number of 0, 3, or 6) are used to encode each of the codewords of an individual codeword row. Thus, all of the codewords in any particular codeword row will be identifiable by the cluster number used to encode that codeword row. Since codeword rows alternate in the codeword set or cluster number that is used to specify codewords, codewords in a common codeword row may be identified. For example, in an exemplary ten-row machine-readable symbol 402, the first, fourth, seventh and tenth codeword rows will be encoded using the "0" cluster number. The second, fifth and, eighth codeword rows will have a "3" cluster number. The third, sixth, and ninth codeword rows will have a "6" cluster number. Accordingly, in such embodiments, decoding information for each codeword provides information verifying, at least within a localized group of codeword rows, which codeword row the codeword belongs to. The prior art uses the adjacent codeword cluster number to create a confidence factor for subsequently collected codewords of the same (row, column) matrix position. However, even though collapsing the initialization symbol matrix 302 into the collapsed machine-readable symbol matrix 602 saves significant time over conventional machine-readable symbol readers, the process of decoding and verifying codeword position in the collapsed machine-readable symbol matrix 602 may be relatively time consuming and computationally complex.

Accordingly, some embodiments optionally employ a relatively fast and relatively less computationally complex verification process that uses a plurality of codeword matrix stacks 802 (FIG. 8), described in greater detail below. Such embodiments may omit determination of the cluster number for each codeword. Rather, information encoded in each codeword is compared with previously decoded information of the same codeword obtained from previously acquired scan lines. In other embodiments, codeword symbols may be compared.

FIG. 8 is a conceptual illustration of a very simple four code word machine-readable symbol residing in a collapsed machine-readable symbol matrix 802. The collapsed machine-readable symbol matrix 802, illustrated as having one codeword per codeword row and four codeword rows for simplicity, is the result of the above-described collapsing of the initialization symbol matrix 302 into the collapsed machine-readable symbol matrix 802 (upon determination of the length of a codeword row) and after determination of the number of codeword rows of the acquired machine-readable symbol.

FIG. 9 is a conceptual diagram illustrating the collapsed symbol matrix for the machine-readable symbol 802 (FIG. 8) and the corresponding codeword matrix stacks 902. A plurality of codeword matrix stacks 902 are associated with each one of the matrix locations in the illustrated collapsed machine-readable symbol matrix 602. In other embodiments, codeword matrix stacks 902 are associated with each one of the codeword row and column locations in the initialization symbol matrix 302 (FIG. 3).

The initialization symbol matrix 302 is populated with acquired codewords (or corresponding decoded information) received from memory, as described above. It is appreciated that information corresponding to an acquired codeword is actually used to populate the matrix. Such information may be in any suitable format, such as a digitized signal based upon detected bars and spaces, may be processed information corresponding to detected bar/space widths and/or position, or may be decoded information determined from the detected bars and spaces and a codeword table or the like which is used to decode the codeword information into an alpha-numeric character. Other forms of information may be used by other embodiments. For convenience, all such forms of information are generically referred to as a "codeword" for purposes of describing the codeword validation process hereinbelow.

Codeword validity is addressed by embodiments of the machine-readable symbol reader 100 through the use of the codeword matrix stacks 802. Validity of an individual codeword is addressed by comparing currently received codewords with previously received corresponding codewords. Results of the comparison, described below, are stored in the codeword matrix stacks 802 by the various embodiments.

When a machine-readable symbol is acquired, the machine-readable symbol reader 100 initializes with the initialization symbol matrix 302. The initialization symbol matrix 302 is populated with acquired codewords received from memory, as described above. However, validation of the codewords is useful to ensure rapid decoding of the acquired machine-readable symbol.

As another example, an exemplary optical line scanner embodiment projects and sweeps a beam of electromagnetic energy across a codeword row to produce a scan line. Multiple sweeps of the projected beam across a codeword row results in a plurality of scan lines for a single codeword row. In another exemplary optical line scanner embodiment, the light sensitive element(s) receives a relatively small portion of, or a point of, returning electromagnetic energy returned from or reflected from the target machine-readable symbol. The returning electromagnetic energy is received from a device, such as mirrors or lens, which are adjusted to sweep across a codeword line. Multiple sweeps of the returning electromagnetic energy across a codeword row results in a plurality of scan lines for a single codeword row.

The plurality of acquired scan lines for each codeword are stored in a suitable memory, such as, but not limited to, RAM 240 (FIG. 2). As noted above, scan lines are received and used to populate the initialization symbol matrix 302. The start and end of each codeword row is determinable. For example, under the PDF417 format, a start character and an end character indicate the beginning and end, respectively, of a codeword row. In other symbology formats, the start and end of a codeword line may be determinable from detected quiet areas or other suitable indicia which precede and follow a codeword line.

When the next scan line is received, individual codewords of the next scan line are compared with previously received corresponding codewords. When individual codewords of the next scan line match, compare, or correlate with previously received codewords, embodiments of the machine-readable symbol reader 100 determine that the received codewords are for a single codeword line and that the codewords are valid.

On the other hand, when individual codewords of the next scan line do not match, do not compare, or do not correlate with previously received codewords in the same matrix location, embodiments of the machine-readable symbol reader 100 determine that the currently received codewords are for a different codeword, may determine that the current scan line has crossed over from one codeword row into another codeword row, or that an error has occurred (such as might be caused by a mark, smudge, tear, or the like occurring on a portion of the acquired machine-readable symbol). In such situations, embodiments of the machine-readable symbol reader 100 may determine that none of, or part of, the currently received scan line is valid or otherwise useable for decoding information for a corresponding codeword. Alternatively, a second valid codeword may be kept in a second matrix stack. Other valid codewords could be similarly kept in other matrix stacks.

Enhanced Voting Codeword Verification Embodiment Using Codeword Symbols

The above-described matrix stacks are used for codeword validation and/or error correction processes. Enhanced-voting embodiments are advantageous when the working memory is relatively large. Matching codewords are saved into the working memory matrix stacks 802. Alternatively, matrix stacks 802 may use a suitable incremented indicia.

One exemplary enhanced-voting embodiment compares acquired codewords to validate received codewords. In some embodiments, the codeword matrix stacks 902 are operable to store multiple copies of a codeword. Other embodiments employ an index or other indexable indicia that are storable in the codeword matrix stacks 902.

Returning to the simplified exemplary collapsed machine-readable symbol matrix 602 illustrated in FIG. 7, the first codeword in the row 1 location using the column 2 location of the collapsed machine-readable symbol matrix 602 is considered. This first codeword is received and stored into the "A" matrix stack when the first scan line for the first codeword row is received. In other embodiments, the indicia of the "A" matrix stack is indexed to a value equivalent to "1."

Then, when that same codeword is received from the next received scan line, that second received codeword is compared to the previously received first codeword. If the second received codeword matches the previously received first codeword, then that second codeword is saved into the "A" matrix stack with the first codeword. Alternatively, the indicia of the "A" matrix stack may be indexed to a value equivalent to "2."

On the other hand, if the second received codeword does not match the first received codeword, but is a valid codeword, then that second received codeword is saved into the "B" matrix stack. Alternatively, the indicia of the "B" matrix stack may be indexed to a value equivalent to "1."

Assuming a third scan line of the current codeword row was acquired, a third corresponding codeword is received from the third received scan line. The third codeword is compared to the previously received first codeword. If the third received codeword matches the previously received first codeword, then that third codeword is saved into the "A" matrix stack. Alternatively, the indicia of the "A" matrix stack may be indexed.

If the second codeword did not match the first codeword, the third received codeword is compared to the previously received second codeword (if present). If the third received codeword matches the second received codeword, then that third codeword is saved into the "B" matrix stack. Alternatively, the indicia of the "B" matrix stack may be indexed. (Assuming that the second received codeword matched the first codeword and was saved as a member of the "A" matrix stack, then the different received third codeword would be saved into the "B" matrix stack as the first entry, or the indicia of the "B" matrix stack may be indexed to a value equivalent to "1.")

On the other hand, if the second received codeword does not match either the first received codeword or the second codeword, but is a valid codeword, then that third codeword is saved into the "C" matrix stack. Alternatively, the indicia of the "C" matrix stack may be indexed to a value equivalent to "1."

The process of comparing and adding codewords into the appropriate matrix stack, or of indexing the indicia of the appropriate matrix stack, may continue until the codeword is validated, as described in greater detail below. That is, a plurality of codewords received from a plurality of received scan lines may be successively compared for at least as many scan lines as are available for that codeword row. For example, if five scan lines of the first codeword row were acquired, then there will be five exemplary codewords for each location of the collapsed machine-readable symbol matrix 602.

FIG. 10 is a conceptual diagram illustrating the codeword matrix stacks 902 for the four codewords of interest of an exemplary machine-readable symbol. For illustrative purposes, assume that five scan lines for each codeword row were acquired from the machine-readable symbol 402. In one embodiment, the acquired scan line information is available from memory. Further, FIG. 10 illustrates how a process for codeword validation may be used by an exemplary enhanced-voting embodiment that indexes a matrix stack indicia. It is appreciated that the example may be modified to facilitate description of a process used by embodiments that store matching codewords into a common matrix stack.

In this hypothetical example, the matrix stack index values for a first codeword corresponds to 4 in the "A" matrix stack and 1 in the "B" matrix stack. That is, from the five scan lines of the first codeword row, three of the subsequently received first codewords matched the initially received first codeword (such that the index value of the "A" matrix stack was equal to 4), and one of the first codewords did not match the initially received first codeword (such that the index value of the "B" matrix stack was equal to 1). Upon conclusion of processing the five scan lines for the first codeword, at some point, the codeword associated with the "A" matrix stack will be determined to be the valid first codeword. For example, the codeword associated with the "A" matrix stack could be used to populate the collapsed machine-readable symbol matrix 602 or the collapsed machine-readable symbol matrix 602, depending upon the embodiment. Alternatively, the codeword symbol from the "A" matrix stack may be selected for decoding.

Continuing with the hypothetical example, the matrix stack index values for a second codeword corresponds to 3 in the "A" matrix stack and 2 in the "B" matrix stack. That is, from the five scan lines of the second codeword row, two of the subsequently received first codewords matched the initially received first codeword (such that the index value of the "A" matrix stack was equal to 3), and two of the first codewords did not match the initially received first codeword (such that the index value of the "B" matrix stack was equal to 2). Upon conclusion of processing the five scan lines for the second codeword, at some point, the codeword associated with the "A" matrix stack will be determined to be the valid second codeword.

The matrix stack index values for a third codeword corresponds to 1 in the "A" matrix stack, 1 in the "B" matrix stack, and 3 in the "C" matrix stack. That is, from the five scan lines of the second codeword row, none of the subsequently received third codewords matched the initially received third codeword (such that the index value of the "A" matrix stack remains equal to 1). Similarly, none of the subsequently received third codewords matched the second received third codeword (such that the index value of the "B" matrix stack remains equal to 1). However, three of the third codewords did match with each other (such that the index value of the "C" matrix stack was equal to 3). Upon conclusion of processing the five scan lines for the third codeword, at some point, the codeword associated with the "C" matrix stack will be determined to be the valid third codeword.

The matrix stack index values for a fourth codeword corresponds to 5 in the "A" matrix stack. That is, from the five scan lines of the second codeword row, all four of the subsequently received fourth codewords matched the initially received fourth codeword (such that the index value of the "A" matrix stack was equal to 5). Upon conclusion of processing the five scan lines for the fourth codeword, at some point, the codeword associated with the "A" matrix stack will be determined to be the valid fourth codeword.

It is appreciated that with relatively large matrix-type machine-readable symbols, large numbers of codewords may be acquired with a plurality of scan lines. These codewords may be rapidly received from the memory, compared with previously received codewords, and processed to validate a codeword.

Figure 11A:
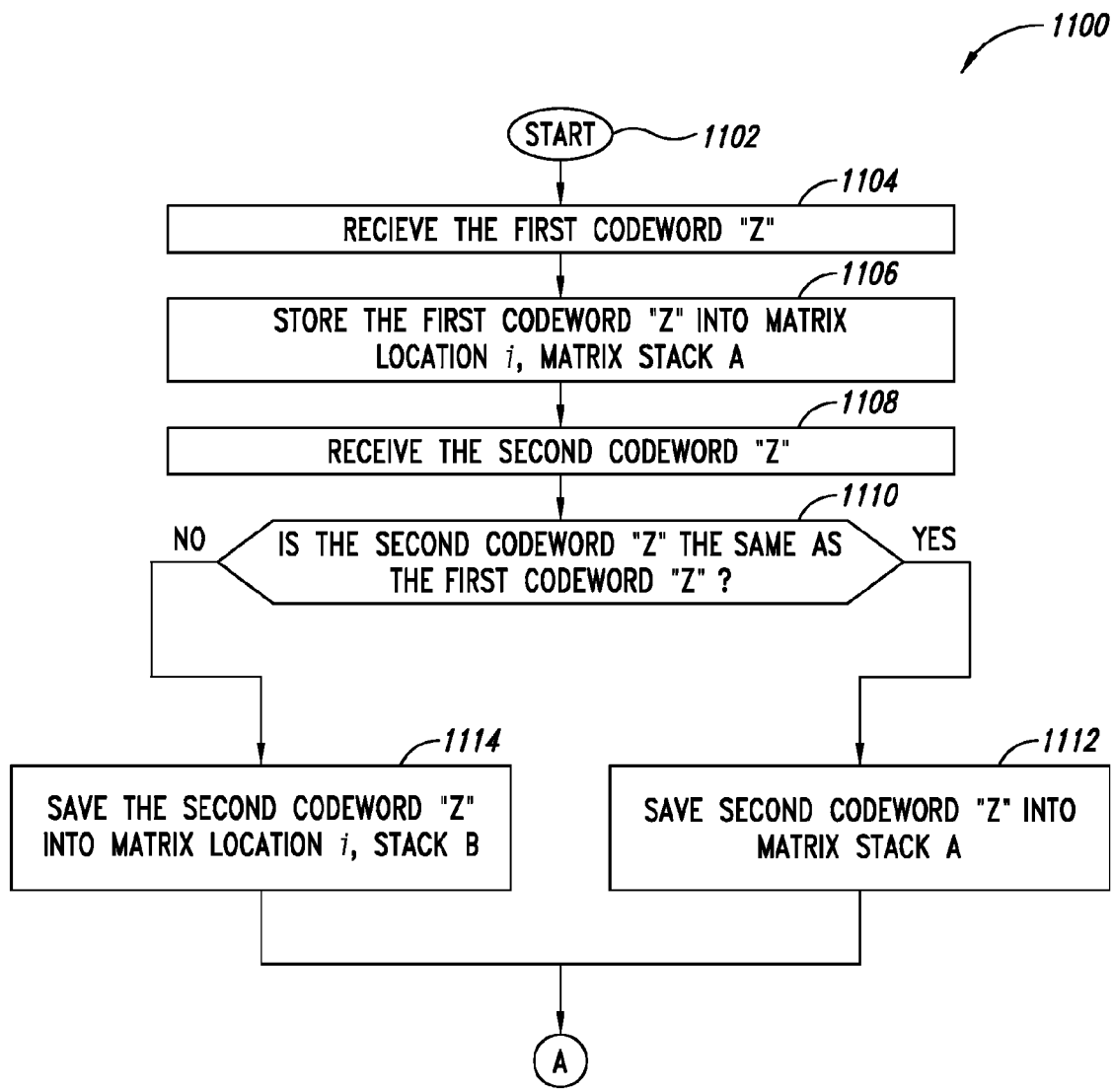
FIGS. 11A-11C are a flowchart illustrating a process for codeword validation used by an exemplary enhanced-voting embodiment.
Figure 11B:
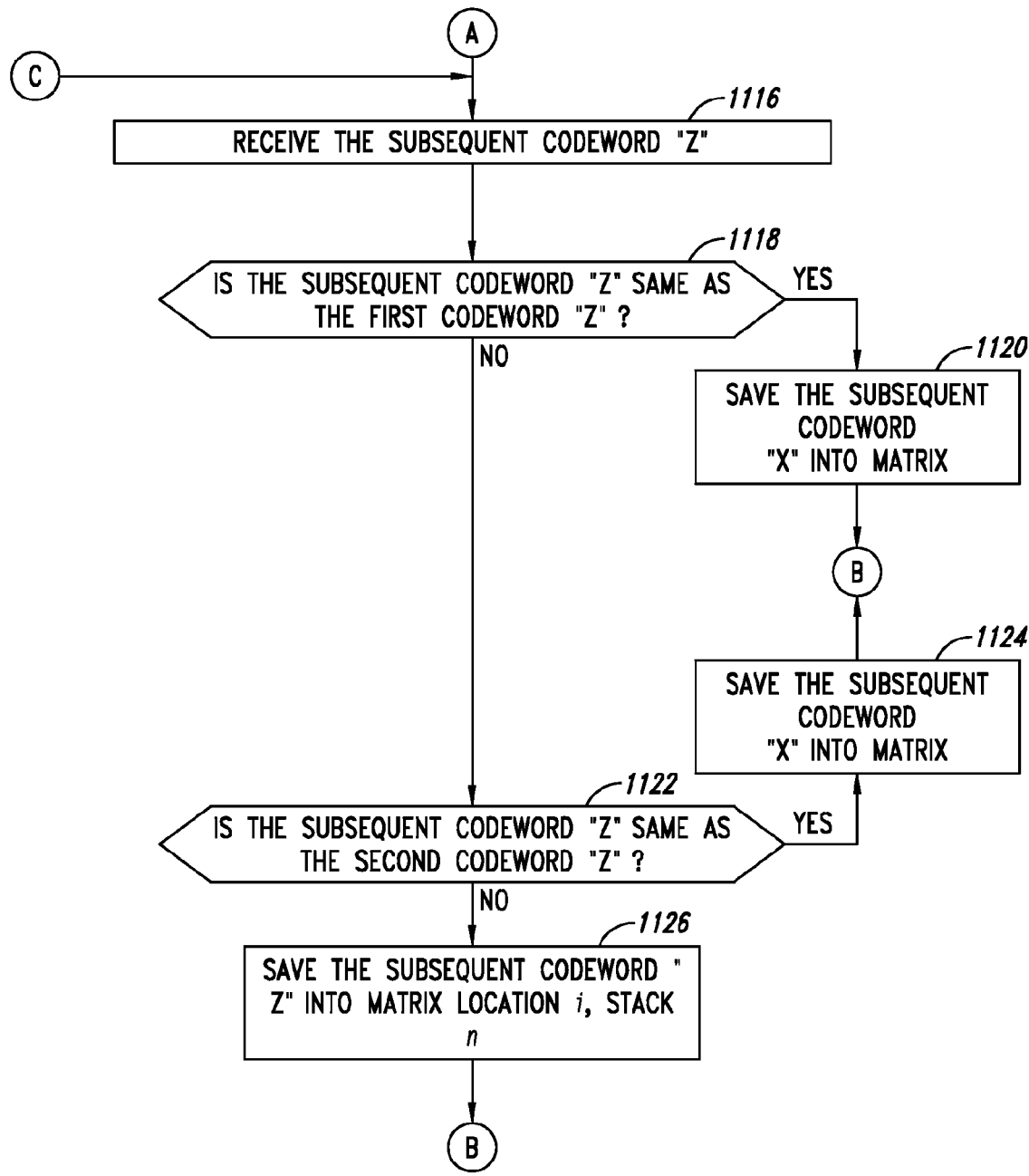
Figure 11C:
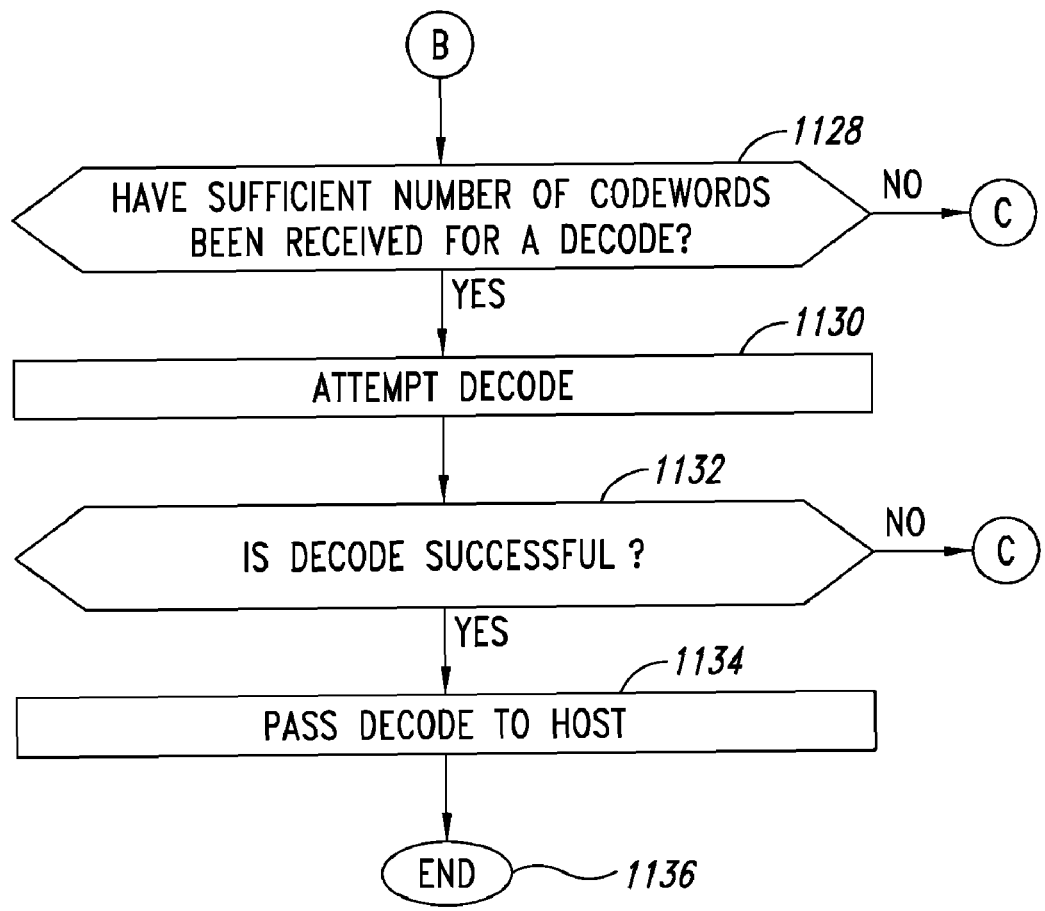

FIGS. 11A-11C are a flowchart 1100 illustrating a process for codeword validation used by an exemplary enhanced-voting embodiment. The flowchart 1100 describes a process used by embodiments that store matching codewords into a common matrix stack. It is appreciated that the flowchart 1100 is modifiable to described processes wherein matrix stack indicia values are incremented as described above.

The flowchart 1100 of FIGS. 11A-11C shows the architecture, functionality, and operation of an embodiment for implementing codeword validation. An embodiment may implement the logic of flowchart 1100 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 11A-11C, or may include additional functions. For example, two blocks shown in succession in FIGS. 11A-11C may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 1102. A codeword "Z" is received at block 1104. The received codeword "Z" is stored into its respective matrix location i, stack A (where i corresponds to the above-described matrix row location and the matrix column location for a codeword, generically denoted as codeword "Z") at block 1106.

A second codeword "Z" is received at block 1108. It is appreciated that the first codeword "Z" and the second codeword "Z" correspond to the same machine-readable symbol codeword received from different scan lines of a common codeword row. That is, the first and second codewords "Z" have the same codeword location in the machine-readable symbol.

A determination is made whether the second codeword "Z" is the same as the first codeword "Z" at block 110. If so (the YES condition), the second codeword "Z" is saved into the matrix stack A at block 1112. The process then proceeds to block 1116.

However, if at block 1110 the second codeword "Z" is not the same as the first codeword "Z" (the NO condition), the process proceeds to block 1114. The second codeword "Z" is saved into the matrix stack B at block 1114. Then, the process proceeds to block 1116.

A subsequent codeword "Z" for a matrix is received at block 1116. A determination is made whether the subsequent codeword "Z" is the same as the first codeword "Z" at block 1118. If so (the YES condition), the subsequent codeword "Z" is saved into the matrix stack A at block 1120. The process then proceeds to block 1128, described in greater detail below.

However, if at block 1118 the subsequent codeword "Z" is not the same as the first codeword "Z" (the NO condition), the process proceeds to block 1122. A determination is made whether the subsequent codeword "Z" is the same as the second codeword "Z" at block 1122. If so (the YES condition), the subsequent codeword "Z" is saved into the matrix stack B at block 1124. The process then proceeds to block 1128, described in greater detail below.

However, if at block 1122 the subsequent codeword "Z" is not the same as the second codeword "Z" (the NO condition), the process proceeds to block 1126. The subsequent codeword "Z" is saved into the matrix stack n at block 1126. (It is appreciated that at this point in the process, the "subsequent" codeword corresponds to the third codeword, and that the third codeword would be stored into matrix stack C.) Then, the process proceeds to block 1128, described in greater detail below.

A determination is made whether a sufficient number of codewords have been obtained for a decode at block 1128. If not (the No condition), the process loops back to block 1116. It is appreciated that the processes of blocks 1116 through blocks 1128 repeatedly loop to receive and process a series of "subsequent" codewords until a sufficient number of codewords are obtained for a decode.

If at block 1128 a sufficient number of codewords are obtained for a decode (the YES condition), the process proceeds to block 1130. A decode is attempted at block 1130. A determination is made whether the decode was successful at block 1132. If the decode was successful (the YES condition), the process proceeds to block 1134. The decode is passed to the host at block 1134. The process continues to block 1136 and ends.

However, if at block 1132 the decode was not successful (the NO condition), the process loops back to block 1116. That is, additional codewords are received and processed until a valid decode occurs. Any one of the above-noted enhanced-voting processes may be used at block 1128 to determine if a sufficient number of codewords have been received for a valid decode. Other processes of validating codewords, described in greater detail below, may be used by alternative embodiments.

The above-described process assumes that at least three scan lines for each codeword row are available from the memory. If two scan lines are available, then those block associated with the third and subsequent scan line are omitted and the process simply ends after the second scan line is processed.

After a successful decode at block 1128, the process is described as passing the decode to a host. The term "host" generally denotes a subsequent processing operation or the like wherein the decoded information is further processed. Accordingly, the "host" may be any suitable processing system, such as processor 212 (FIG. 2). That is, the "host" may be the same processing system implementing the above-described flow chart 1100, or may be a separate processing system.

Simple Voting

An alternative embodiment may perform the above-described process of validating a codeword using a simple voting process. A suitable voting threshold is used to validate codewords. Codeword comparisons are tracked. In some embodiments, matching codewords are stored into the same matrix stack. In other embodiments, the stack value indicia is incremented for each match and decremented for each mismatch. When the voting threshold is reached, the codeword is validated. Some embodiments may employ multiple voting thresholds.

One exemplary embodiment employs a first voting threshold equal to two and a second voting threshold equal to three. The first voting threshold validates the codeword if the first two received codewords match. This means that once the same codeword has been received two consecutive times (if no other codeword value is received), the codeword is validated. The second voting threshold applies to if the first two received codewords do not match. Then, there must be three consecutive times that matching codewords are received to validate the codeword.

Codeword Verification Using Codeword Information

Another embodiment decodes acquired codewords into codeword information. In one embodiment, the codeword information is compared and used to generate a codeword validity measure. The validity measure depends upon the "quality" of the signal for the codeword itself (and not the codeword symbol, its value, or the status of the information from adjacent codewords).

This embodiment records the "goodness" of each of the decoded element widths by comparing the element widths to the ideal element widths for that codeword. The determined "goodness" values or the like may be saved and/or sorted using the above-described matrix stacks 802. In other embodiments, the codewords or codeword values are stored in the matrix stacks 802. This approach is analogous to measurement of "decodability" of the ISO Print Quality Specification, incorporated herein by reference. Codewords or codeword values with better validity measures are then favored for populating the above-described matrixes. When the symbol character with the best decoded element widths is determined, its corresponding codeword or codeword value may be selected.

In other embodiments, the codewords or codeword values are stored in the matrix stacks 802. When the symbol character with the best validity measurement is determined, its corresponding codeword or codeword value may be selected or otherwise identified as the validated codeword.

Non-Decode Matrix Size Determination

Various embodiments described above determine the number of codewords in a codeword row and the number of codeword rows so that the initialization symbol matrix 302 is collapsed. In alternative embodiments, bar widths are summed to determine a cluster number and row indicator information prior to populating the initialization symbol matrix 302. Summing bar widths allows the above-described information to be determined without searching massive codeword tables to decode a received codeword. A sufficient number of codewords are received and processed (summing bar widths) such that a valid number of codewords in a codewords row, a valid number of codeword rows, and/or a valid error correction is determined.

Once the number of codewords in a codewords row, the number of codeword rows, and/or the error correction information is determined, received codewords may be decoded in one step as they are received.

Alternative Embodiments

In an alternative embodiment, both the length of a codeword row and the number of codeword rows are determined. Then, the initialization symbol matrix 302 (FIG. 3) may be collapsed into the collapsed machine-readable symbol matrix 602 (FIG. 6) in one collapsing step.

In other embodiments, the number of codeword rows is first determined. Then, the initialization symbol matrix may be collapsed into a partially-collapsed machine-readable symbol matrix in a first collapsing process. Next, the length of a codeword row is determined. Then, the partially-collapsed machine-readable symbol matrix may be collapsed into collapsed machine-readable symbol matrix in a second collapsing process.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media, such as digital and analog communication links using TDM or IP based communication links (e.g., packet links).

The various embodiments described above can be combined to provide further embodiments. All of the above U.S. patents, patent applications and publications referred to in this specification, including but not limited to: U.S. patent application Ser. No. 11/040,485, filed Jan. 20, 2005, and entitled "AUTOFOCUS BARCODE SCANNER AND THE LIKE EMPLOYING MICRO-FLUIDIC LENS," are incorporated herein by reference, in their entirety, as are the sections in this specification. Aspects of the present systems and methods can be modified, if necessary, to employ systems, circuits and/or concepts of the various patents, applications, and publications to provide yet further embodiments.

These and other changes can be made to the present systems and methods in light of the above-detailed description. In general, in the following claims, the terms used should not be construed to limit the invention to the specific embodiments disclosed in the specification and the claims, but should be construed to include all machine-readable symbol scanning and processing systems and methods that read in accordance with the claims. Accordingly, the invention is not limited by the disclosure, but instead its scope is to be determined entirely by the following claims.

The invention claimed is:

1. A method for acquiring a machine-readable symbol, the method comprising:
   initializing an initialization symbol matrix to be larger than the amount of information acquirable from the machine-readable symbol;
   receiving at least one scan line of a codeword row;
   determining a number of codewords of the codeword row; and
   collapsing said initialization symbol matrix into a partially-collapsed machine-readable symbol matrix based upon the determined number of codewords.

2. The method of claim 1, further comprising:
   populating the initialization symbol matrix with the codewords of the codeword row.

3. The method of claim 1, further comprising:
   determining a number of a plurality of codeword rows; and
   collapsing the partially-collapsed machine-readable symbol matrix into a collapsed machine-readable symbol matrix based upon the determined number of codeword rows.

4. The method of claim 3, further comprising:
   populating the collapsed machine-readable symbol matrix with a plurality of codewords from the machine-readable symbol.

5. The method of claim 3 wherein collapsing the partially-collapsed machine-readable symbol matrix into the collapsed machine-readable symbol matrix comprises:
   collapsing the initialization symbol matrix from a maximum number of codeword rows to the determined number of codeword rows.

6. The method of claim 3, wherein determining the number of the plurality of codeword rows comprises:
   decoding at least one selected row indicator codeword of the machine-readable symbol to determine the number of the plurality of codeword rows.

7. The method of claim 1 wherein determining the number of codewords of the codeword row comprises:
   determining a length of the codeword row.

8. The method of claim 1 wherein collapsing the initialization symbol matrix into the partially-collapsed machine-readable symbol matrix comprises:
   collapsing the initialization symbol matrix from a maximum number of codewords in the codeword row to the determined number of codewords of the codeword row.

9. The method of claim 1 wherein determining the number of codewords of the codeword row comprises:
   summing bar widths of at least one selected codeword of the machine-readable symbol to determine the number of codewords of the codeword row.

10. The method of claim 1, further comprising:
    initializing the initialization symbol matrix before receiving the at least one scan line of the codeword row.

11. The method of claim 10 wherein initializing the initialization symbol matrix comprises:
    determining a format for the machine-readable symbol; and
    based upon the determined format, defining a size for the initialization symbol matrix that corresponds to a maximum size of the machine-readable symbol.

12. The method of claim 1, further comprising:
    populating the initialization symbol matrix with a plurality of codewords from the machine-readable symbol.

13. The method of claim 12 wherein populating the initialization symbol matrix with the plurality of codewords comprises:
    receiving a first scan line having a first codeword;
    storing the first codeword into a first matrix stack at a first location, wherein the first location corresponds to a location of the first codeword in the machine-readable symbol, and wherein the location of the first codeword corresponds to a codeword row number and a codeword column number;
    receiving a second scan line having a second codeword, wherein a location of the second codeword in the machine-readable symbol is the same as the location of the first codeword in the machine-readable symbol;
    comparing the second codeword to the first codeword;

storing the second codeword into the first matrix stack in response to the second codeword matching the first codeword; and storing the second codeword into a second matrix stack in response to the second codeword not matching the first codeword.

14. The method of claim 1 wherein collapsing the initialization symbol matrix into the partially-collapsed machine-readable symbol matrix based upon the determined number of codewords is performed before receiving a last codeword row of the machine-readable symbol.

15. The method of claim 14 wherein collapsing the initialization symbol matrix is performed before receiving any scan line of the last codeword row of the machine readable symbol.

16. The method of claim 1 wherein collapsing the initialization symbol matrix into the partially-collapsed machine-readable symbol matrix based upon the determined number of codewords is performed before receiving a last scan line of the machine-readable symbol.

17. A system that acquires a machine-readable symbol, comprising:
an optical system operable to acquire information from the machine-readable symbol;
a first memory portion operable to receive the acquired information;
a second memory portion operable to initialize an initialization symbol matrix to be larger than the amount of information acquirable from the machine-readable symbol; and
a processor configured to:
receive at least one scan line of a codeword row before a final size of the initialization matrix has been established;
determine at least one codeword in the at least one scan line;
populate the initialization symbol matrix with the at least one codeword; and
determine a length of the codeword row.

18. The system of claim 17 wherein the processor is further configured to collapse the initialization symbol matrix into a partially-collapsed machine-readable symbol matrix based upon the determined length of the codeword row.

19. The system of claim 17 wherein the processor is further configured to:
determine a number of a plurality of codeword rows; and
collapse the partially-collapsed machine-readable symbol matrix into a collapsed machine-readable symbol matrix based upon the determined number of codeword rows.

20. The system of claim 17 wherein the optical system comprises:
a charge coupled device (CCD) comprised of at least one row of light sensitive elements, wherein the at least one scan line corresponds to the at least one row of light sensitive elements, and wherein the at least one scan line corresponds to the codeword row of the machine-readable symbol detected by the at least one row of light sensitive elements.

21. The system of claim 17 wherein the optical system comprises:
an optical line scanner with one or more light sensitive elements operable to detect a small region of electromagnetic energy returning from the machine-readable symbol, wherein the at least one scan line corresponds to the codeword row of the machine-readable symbol detected by the one or more light sensitive elements.

22. A system that acquires a machine-readable symbol, comprising:
means for acquiring information from the machine-readable symbol;
means for receiving at least one scan line of a codeword row;
means for determining a length of the codeword row;
means for collapsing an initialization symbol matrix into a partially-collapsed machine-readable symbol matrix based upon the determined length of the codeword row, wherein the initialization matrix is larger than the information included in the machine-readable symbol;
means for determining a number of a plurality of codeword rows; and
means for collapsing the partially-collapsed machine-readable symbol matrix into a collapsed machine-readable symbol matrix based upon the determined number of codeword rows, wherein the system is configured to capture the codeword row before a final size of the initialization matrix has been established.

23. The system of claim 22, further comprising:
means for populating the collapsed machine-readable symbol matrix with a plurality of codewords from the machine-readable symbol.

24. The system of claim 22 wherein the means for determining the length of the codeword row comprises:
means for determining a number of codewords of the codeword row.

25. A method for validating codewords acquired from a machine-readable symbol, the method comprising:
receiving a first codeword from a first scan line;
associating the first codeword with a first matrix stack;
receiving a second codeword from a second scan line, wherein a location of the second codeword in the machine-readable symbol is the same as a location of the first codeword in the machine-readable symbol;
comparing the second codeword to the first codeword;
associating the second codeword with the first matrix stack in response to the second codeword matching the first codeword; and
associating the second codeword with a second matrix stack in response to the second codeword not matching the first codeword.

26. The method of claim 25, further comprising:
in response to the second codeword matching the first codeword, validating the first codeword.

27. The method of claim 25 further comprising, in response to the second codeword not matching the first codeword:
receiving a third codeword from a third scan line, wherein a location of the third codeword in the machine-readable symbol is the same as the location of the first codeword and the second codeword in the machine-readable symbol;
comparing the third codeword to the first codeword;
associating the third codeword with the first matrix stack in response to the second codeword matching the first codeword;
in response to the third codeword not matching the first codeword, comparing the third codeword to the second codeword and associating the third codeword with the second matrix stack in response to the third codeword matching the second codeword; and
in response to the third codeword not matching the second codeword, associating the third codeword with a third matrix stack.

28. The method of claim 27, further comprising:
validating the first codeword in response to the third codeword matching the first codeword; and validating the second codeword in response to the third codeword matching the second codeword.

29. The method of claim 25, further comprising:
receiving a plurality of subsequent codewords from a plurality of scan lines, wherein a location of each of the plurality of subsequent codewords in the machine-readable symbol is the same as the location of the first codeword and the second codeword in the machine-readable symbol; and
for each of the plurality of subsequent codewords, the method further comprising:
comparing a subsequent codeword to at least the first codeword and the second codeword;
associating the subsequent codeword with the first matrix stack in response to the subsequent codeword matching the first codeword; and
associating the subsequent codeword with the second matrix stack in response to the subsequent codeword matching the second codeword; and
after each of the plurality of subsequent codewords has been compared, the method further comprising:
validating the first codeword in response to the first codeword being associated a greatest number of times with the plurality of subsequent codewords; and
validating the second codeword in response to the second codeword being associated a greatest number of times with the plurality of subsequent codewords.

30. The method of claim 29, further comprising:
validating one of the subsequent codewords in response to the subsequent codeword being associated the greatest number of times with the plurality of subsequent codewords.

31. The method of claim 29 wherein validating the first codeword in response to the first codeword being associated the greatest number of times with the plurality of subsequent codewords, and wherein validating the second codeword in response to the second codeword being associated the greatest number of times with the plurality of subsequent codewords, comprises:
comparing a first number of times that the first codeword is associated with the plurality of subsequent codewords to a threshold; and
validating the first codeword in response to the first number at least meeting the threshold.

32. The method of claim 25 wherein associating the first codeword with the first matrix stack comprises:
storing the first codeword in the first matrix stack;
wherein associating the second codeword with the first matrix stack comprises:
storing the second codeword in the first matrix stack; and
wherein associating the second codeword with the second matrix stack comprises:
storing the second codeword in the second matrix stack.

33. The method of claim 32, further comprising:
receiving a plurality of subsequent codewords from a plurality of scan lines, wherein a location of each of the plurality of subsequent codewords in the machine-readable symbol is the same as the location of the first codeword and the second codeword in the machine-readable symbol; and
for each of the plurality of subsequent codewords, the method further comprising:
comparing a subsequent codeword to at least the first codeword and the second codeword;
storing the subsequent codeword in the first matrix stack in response to the subsequent codeword matching the first codeword;
storing the subsequent codeword in the second matrix stack in response to the subsequent codeword matching the second codeword; and
after each of the plurality of subsequent codewords has been compared, the method further comprising:
validating the first codeword in response to the first matrix stack having a greatest number of codewords stored therein; and
validating the second codeword in response to the second matrix stack having a greatest number of codewords stored therein.

34. The method of claim 25 wherein associating the first codeword with the first matrix stack comprises:
indexing a first indicia associated with the first matrix stack to a first value;
wherein associating the second codeword with the first matrix stack comprises:
indexing the first indicia associated with the first matrix stack to a second value; and
wherein associating the second codeword with the second matrix stack comprises:
indexing a second indicia associated with the second matrix stack to a third value.

35. The method of claim 34, further comprising:
receiving a plurality of subsequent codewords from a plurality of scan lines, wherein a location of each of the plurality of subsequent codewords in the machine-readable symbol is the same as the location of the first codeword and the second codeword in the machine-readable symbol; and
for each of the plurality of subsequent codewords, the method further comprising:
comparing a subsequent codeword to at least the first codeword and the second codeword;
indexing the first indicia associated with the first matrix stack to a higher value in response to the subsequent codeword matching the first codeword;
indexing the second indicia associated with the second matrix stack to a higher value in response to the subsequent codeword matching the second codeword; and
after each of the subsequent codewords has been compared, the method further comprising:
validating the first codeword in response to the first indicia having a greater value than the second indicia; and
validating the second codeword in response to the second indicia having a greater value than the first indicia.

36. The method of claim 25, further comprising:
acquiring the first scan line from at least a first row of light sensitive elements; and
acquiring the second scan line from at least a second row of light sensitive elements.

37. The method of claim 25, further comprising:
acquiring the first scan line and the second scan line from an optical line scanner with one or more light sensitive elements operable to detect a first portion and a second portion of a codeword row of the machine-readable symbol.

38. The method of claim 25 wherein a matrix location of the first codeword corresponds to a codeword row number and a codeword column number, and wherein a matrix location of the second codeword corresponds to the codeword row number and the codeword column number.

39. A method for validating codewords acquired from a machine-readable symbol, the method comprising:
receiving a first codeword from a first scan line;
decoding the first codeword into first codeword information;

determining a first validity for the first codeword information;

receiving a second codeword from a second scan line, wherein a location of the second codeword in the machine-readable symbol is the same as a location of the first codeword in the machine-readable symbol;

decoding the second codeword into second codeword information; and determining a second validity for the second codeword information.

40. The method of claim 39, further comprising:

associating the first codeword with a first matrix stack;

associating the first validity with the first matrix stack;

associating the second codeword with a second matrix stack; and associating the second validity with the second matrix stack.

41. The method of claim 39, further comprising:

validating the first codeword in response to a comparison of the first validity with the second validity.

42. The method of claim 39 wherein determining the first validity for the first codeword information and determining the second validity for the second codeword information comprises:

determining a first accuracy for the first codeword information; and determining a second accuracy for the second codeword information.

* * * * *